Jan. 15, 1935.  E. E. WINKLEY  1,987,811
MEASURING MACHINE
Filed Dec. 4, 1930   10 Sheets-Sheet 3
Fig. 3.
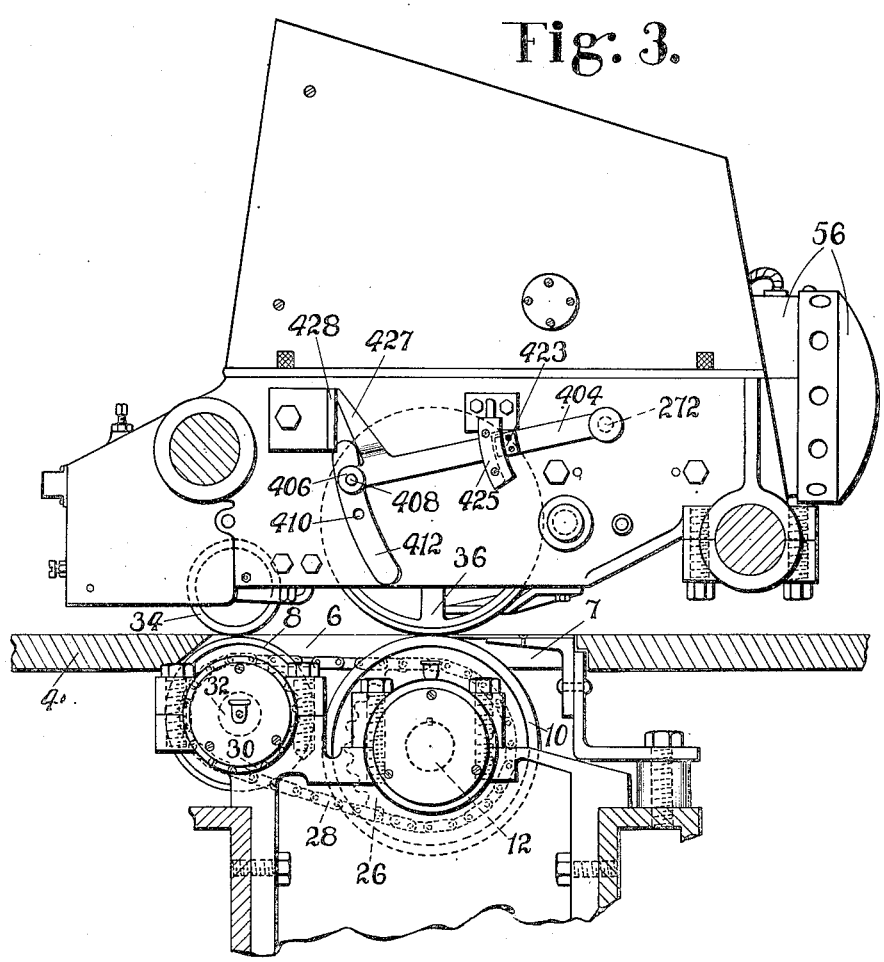
Fig. 3.ª
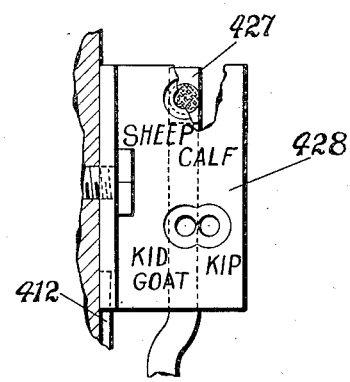
INVENTOR
Erastus E. Winkley
By his Attorney,
Harlow M. Davis

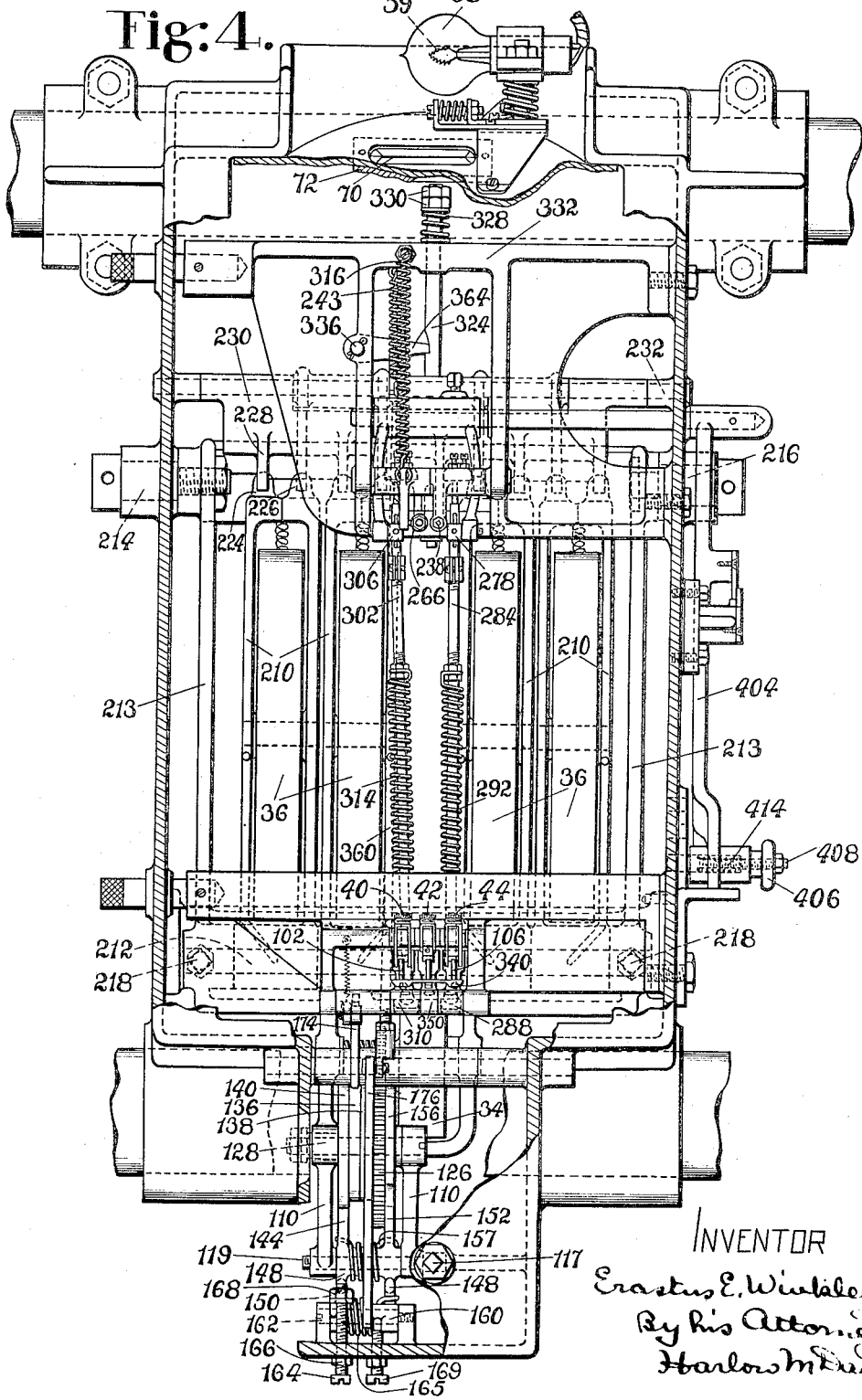

Jan. 15, 1935.　　　　E. E. WINKLEY　　　　1,987,811
MEASURING MACHINE
Filed Dec. 4, 1930　　　10 Sheets-Sheet 5
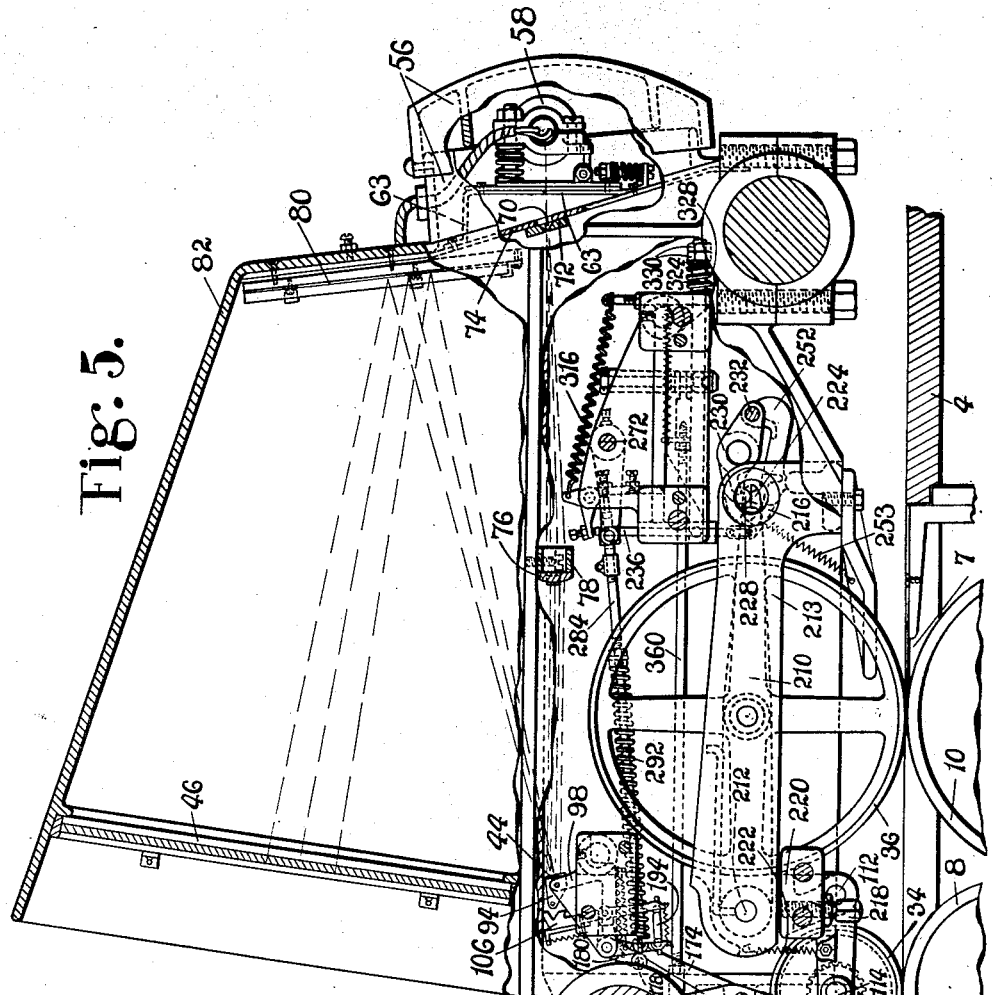
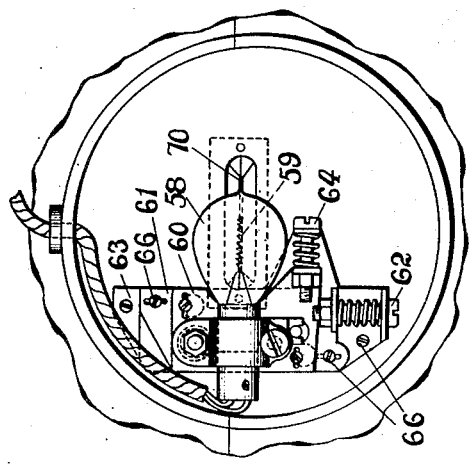
INVENTOR
Erastus E. Winkley
By his Attorney,
Harlow M. Davis

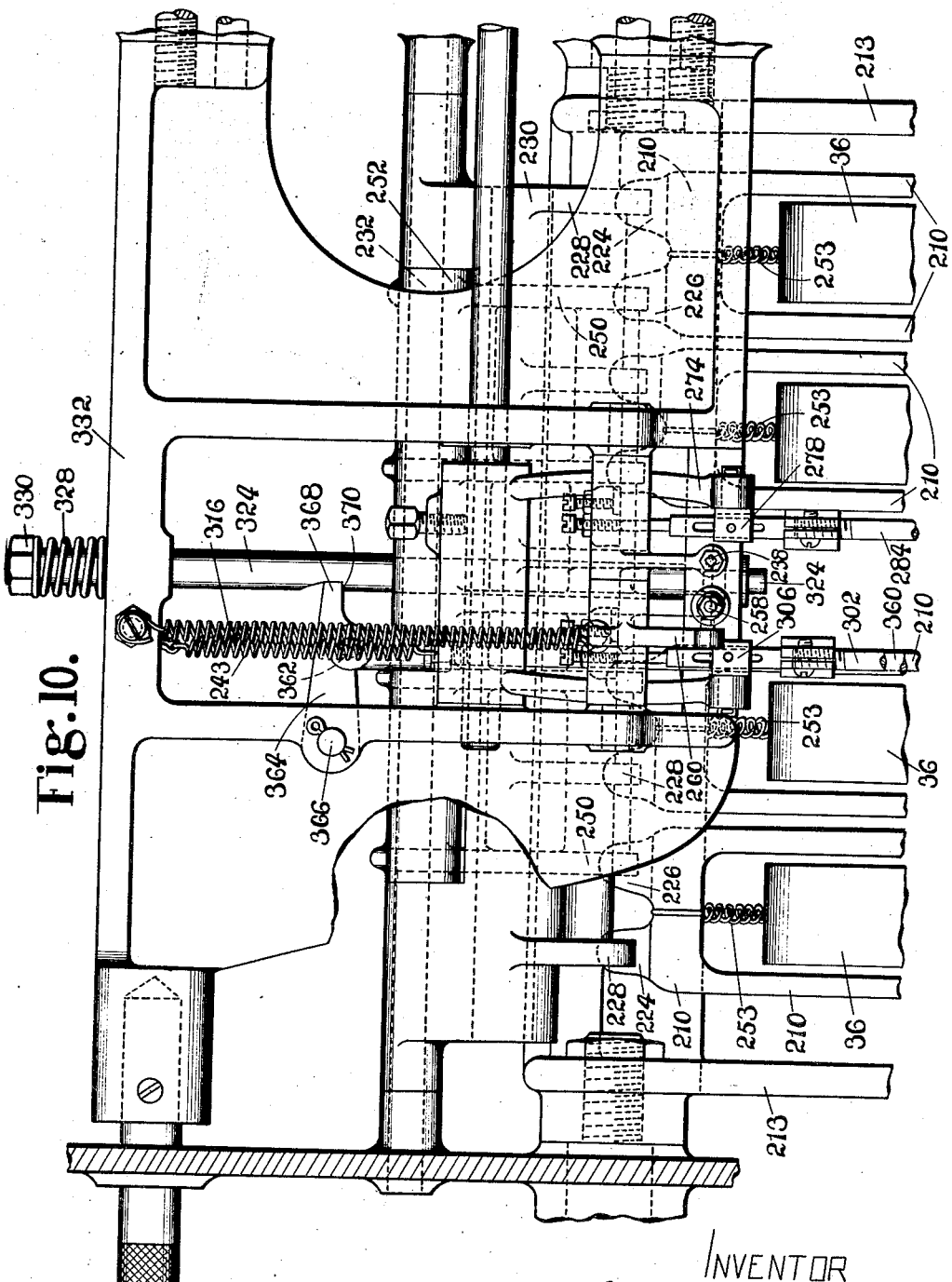

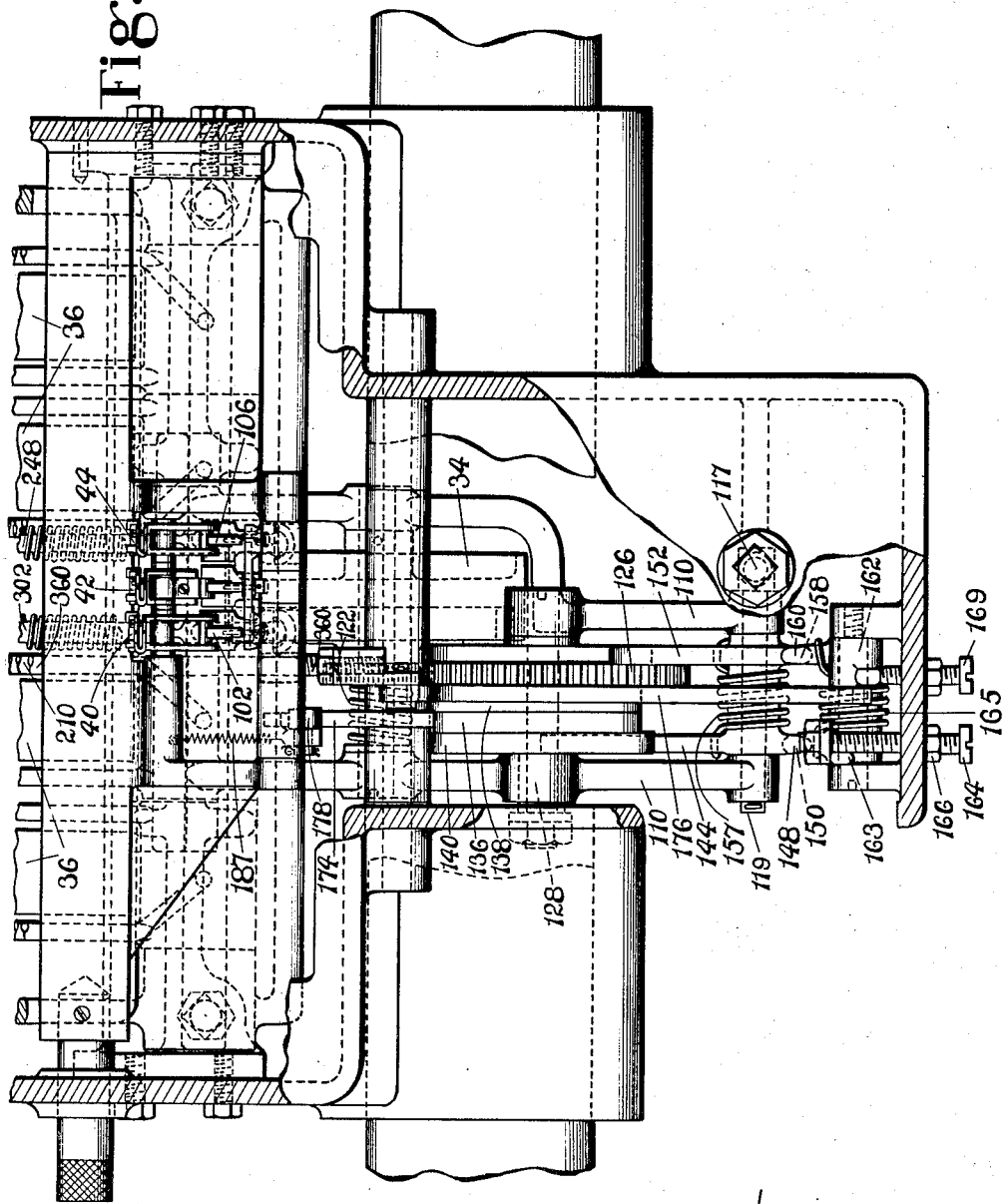

Jan. 15, 1935.　　　　E. E. WINKLEY　　　　1,987,811
MEASURING MACHINE
Filed Dec. 4, 1930　　　10 Sheets-Sheet 9
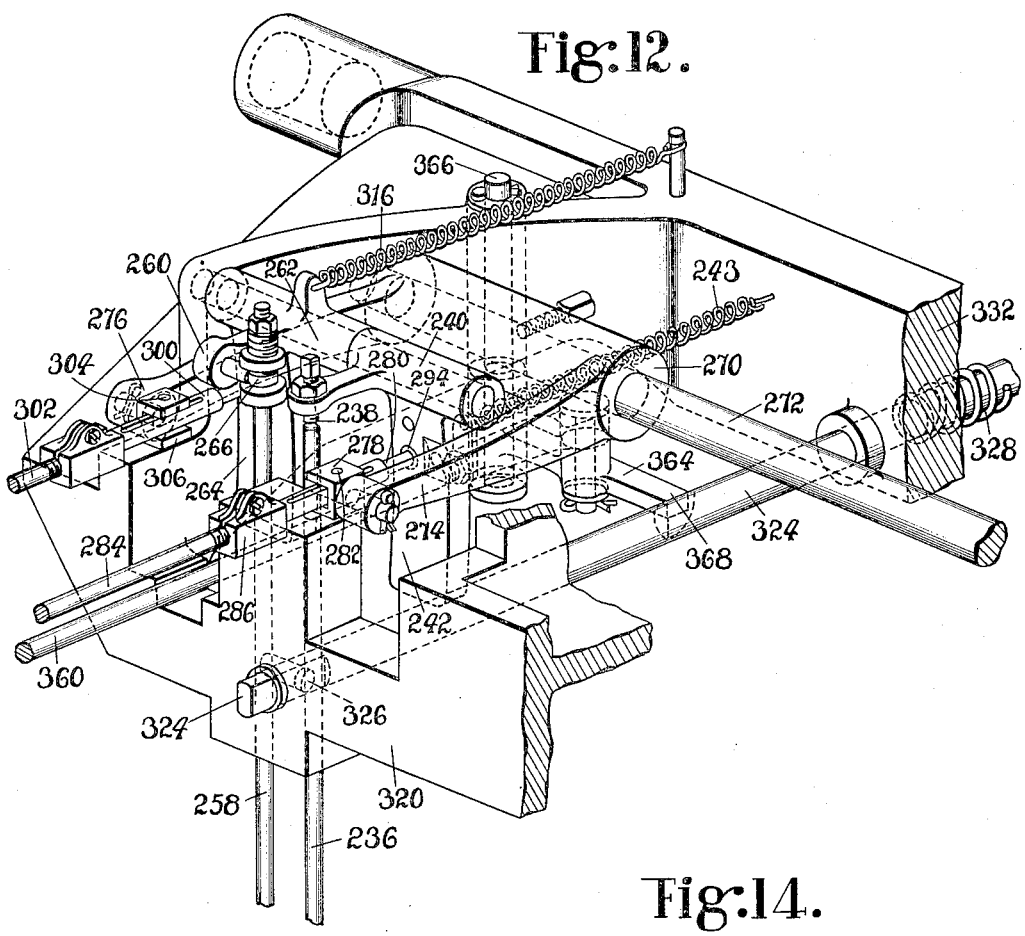
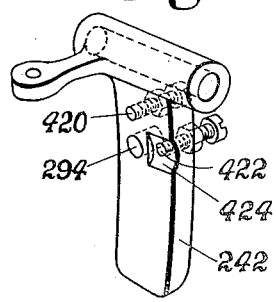
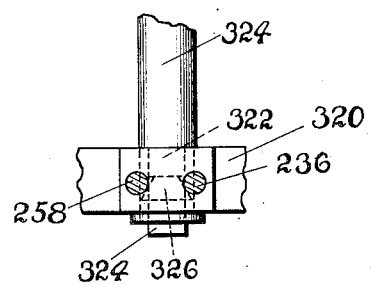
INVENTOR
Erastus E. Winkley
By his Attorney,
Harlow M. Davis

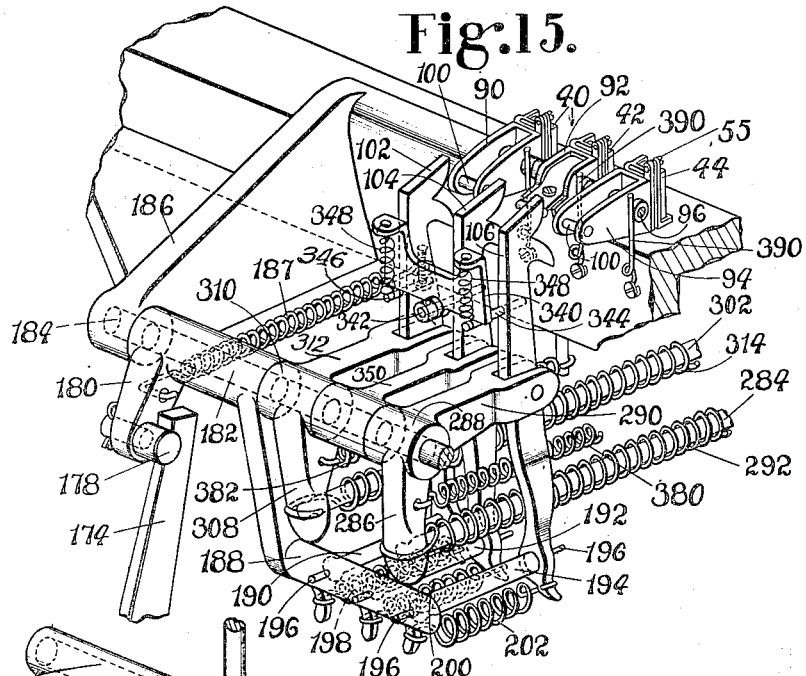
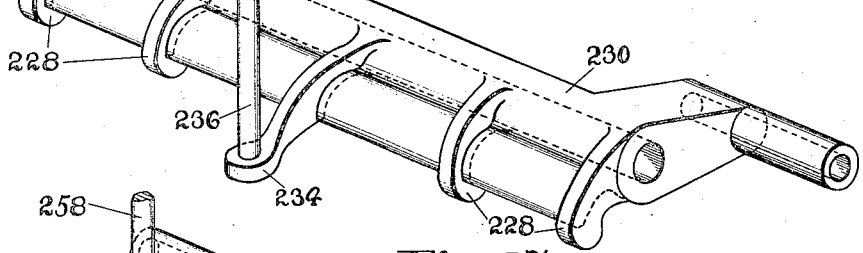
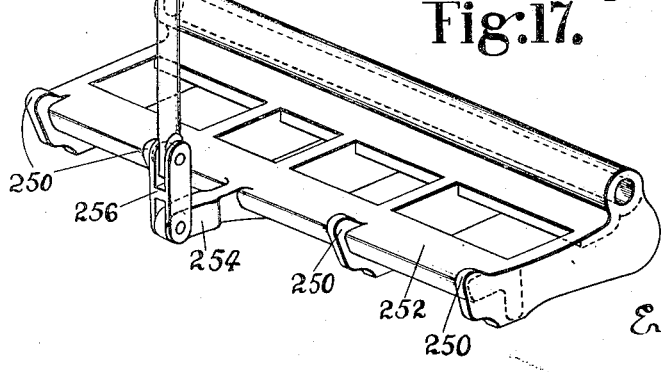

Patented Jan. 15, 1935

1,987,811

UNITED STATES PATENT OFFICE 1,987,811

MEASURING MACHINE

Erastus E. Winkley, Lynn, Mass., assignor to The Turner Tanning Machinery Company, Portland, Maine, a corporation of Maine Application December 4, 1930, Serial No. 499,992

35 Claims. (Cl. 33—148)

This invention relates to machines for measuring characteristics of pieces of work. While the illustrated embodiment of the invention is specially adapted to the measuring of thickness dimensions of hides, skins, and pieces of leather it is to be understood that the invention and various important features thereof may have other applications and uses.

It is an object of the invention to provide for measurement of the pieces of work within certain predetermined portions only of each piece of work because of the fact that in many cases pieces of work are most advantageously classified in accordance with determinations taken in such predetermined portions of the work. Further objects of the invention are to provide for indicating various degrees or limits of a given characteristic of a piece of work, without undue complexity in the means employed, and to provide improvements applicable to measuring machines in general.

In the assorting of hides and skins and pieces of leather according to their thickness dimensions it is common practice to restrict the hand measurement of each piece of work to those portions which are more or less removed from the shank and flank portions since the latter portions represent the least desirable portions from the standpoint of the manufacturer. In other words, measurement is made of those portions of each piece of leather which lie along each side of the backbone line beginning a substantial but variable distance back from the head end of the piece of leather and terminating at the extreme end of the butt portion of the same piece of leather or on a line spaced variably from said end of the butt portion. The described portion of the leather contains the most desirable portions for the reason that here the grain surface has a finer appearance, the fibers throughout are firmer with less tendency to stretch unduly, and the quality of the leather in general is higher than in those portions nearer to the margins heretofore referred to as the shank and flank portions.

Accordingly, it is an important feature of the invention that improved means is provided for indicating the measurements with respect to certain predetermined portions only of each piece of work. In other words, novel provision is made for unmeasured portions at the front or entering end of the piece of work and in certain cases also for unmeasured portions at the rear or following end of the same piece of work. Conveniently, a work contacting member, arranged to be lifted by the front or entering end of the work and to drop off of the rear or following end of the work, not only drives but controls the indicating means of the illustrated machine so that the indicating means is unresponsive to work calipering means for a predetermined time while the latter is in contact with the front or entering end of the work and, in certain cases also, with the rear end of the same piece of work. By thus providing a work contacting member for driving and controlling the indicating means it is possible to control the indicating means accurately and effectively from the work itself. By providing means under the control of the operator for adjusting the work contacting member or of parts controlled thereby, it is possible to vary the unmeasured portions at the front and/or at the rear ends of the work to suit the machine for measuring operations upon various classes of work. In the illustrated embodiment of the invention, the means for controlling the indicating means comprises a timing mechanism comprising a cam member arranged to be driven by the work contacting member so that the movement of the cam member bears a predetermined relation to the movement of the work. It follows that through adjustment of the cam member the timing of the control of the indicating means by the work contacting member may be predetermined by the operator so that the unmeasured portion at the front end of the work and, if desired also, at the rear end of the work may be varied to suit various conditions. It is a further important feature of the illustrated mechanism that the work contacting member controls the time of operation of the cam member, locking means being conveniently provided for the cam member under control of the work contacting member, the arrangement being such that as the work contacting member is lifted by the front end of the work the cam member is unlocked so that it may be driven by the work contacting member. When the work contacting member drops off of the rear end of the work, locking of the cam member takes place after a predetermined interval in accordance with adjustment of the cam member.

Another important feature of the invention resides in improved means for indicating both the minimum and maximum limits of given characteristics of the work, in this case, the minimum and maximum thickness dimension of the work at any given instance during measuring operations. Preferably, the average thickness is also indicated by novel means provided for that purpose. Furthermore, in the illustrated organization, the means for indicating the maximum and minimum thickness dimensions operate independently but co-operate to effect operation of the average thickness indicating means.

For obtaining indications of the maximum and minimum thickness dimensions of a piece of work, connections are provided between the work calipering means and the indicating means comprising, in the illustrated machine, two members, one of which is moved in one direction only by the calipering means and the other of which is moved only in a direction opposite to that of the first-mentioned member through connections with the same calipering means. Conveniently, the connections between the calipering and indicating means comprise a member having upwardly facing surfaces for lifting a vertically movable member during upward movement of the calipering means in response to portions of progressively greater thickness in the piece of work being measured, the arrangement being such that when thinner portions are encountered said member with its upwardly facing surfaces simply drops away from the lifted member which is thus moved in the upward direction only. The same connections comprise also another member having downwardly facing surfaces arranged to contact with another vertically movable member to pull the same downwardly as progressively thinner portions are encountered in the piece of work undergoing measurement, the arrangement being such that when thicker portions are encountered the said downwardly facing surfaces simply move upwardly away from the vertically movable member whereby the latter is moved in response to the presence of progressively thinner portions only in the work.

It is a further important feature of the invention that special indicating means is provided which may find application in various types of measuring machines. As illustrated, the indicating means comprises a beam of light arranged to be projected upon an indicator member at various levels to indicate variations in a given characteristic of pieces of work. Conveniently a reflector is provided between a source of light and an indicator plate, said reflector being movable to project a beam of light at various levels upon an indicator plate with which is associated a scale or other indicator means. Through connections with work measuring means the reflector is moved in response to movements of the measuring means to vary the position of the beam of light on the indicator plate and in this way indicate measurements of the pieces of work. As illustrated, a plurality of reflectors is provided to indicate different degrees of measurement. Furthermore, the reflectors may be set at different angles so as to vary the size or the lengths of the beams or bars of light projected upon the indicator plate, thus facilitating correct reading of the beams or bars of light by the operator. Preferably, and as shown, the source of light projected upon the reflector or reflectors is an incandescent lamp the filament of which is so positioned as to be opposite a slot through which light from the filament passes directly to the reflector or reflectors whereby a brilliant light is obtained, on the indicator plate, clearly observable in any room of a factory lighted in the usual way.

These and other important features of the invention and novel combinations of parts will now be described in detail and then pointed out in the appended claims.

In the drawings,

Fig. 3 is a view, partly in section, and looking from the right in Fig. 1;

Fig. 3a is a detail view of an indicator plate shown in Fig. 3, looking from the left in said figure;

Fig. 4 is a plan view of the machine from above, with the cover removed to show the working parts of the machine;

Fig. 5 is a view similar to Fig. 3 but with parts sectioned to show the internal mechanism of the machine;

Fig. 6 is a detail view of an electric lamp and its mounting;

Figs. 10 and 11 are detail views which, together, show the mechanisms of Fig. 4 on an enlarged scale;

Fig. 12 is a detail view showing parts back of the calipering wheels in Fig. 5 on an enlarged scale;

Figs. 13 and 14 show details of parts also disclosed in Fig. 12;

Fig. 15 shows parts above and in front of the calipering wheels in Fig. 5 on an enlarged scale, these parts including particularly the assembly of mirrors and their operating means; and Figs. 16 and 17 are details of parts shown in plan view in Fig. 10.

Figure 2:
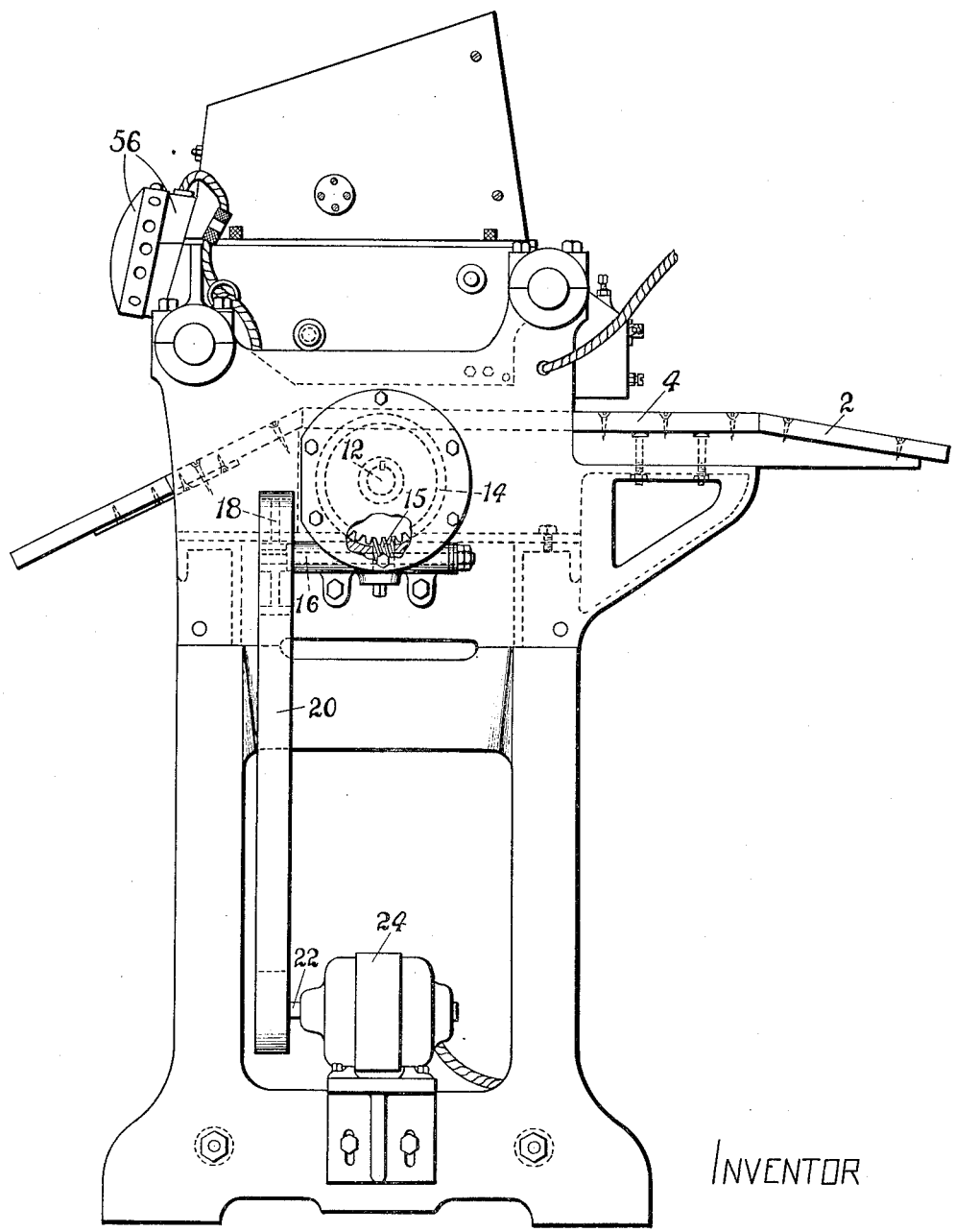
Fig. 2 is a view taken from the left in Fig. 1.

In the illustrated machine, which is specially designed for making and indicating thickness measurements of hides and skins, there is provided a feeding-in table 2 (Fig. 2) which is closely abutted against a table 4 (Figs. 2 and 5) adapted to support the greater part of the work during its passage through the machine. Extending through an opening at 6 in the table is a lower feeding-in roll 8, a bed roll 10 having its upper portion projecting into a parallel slot 7 in spaced relation to the feeding-in roll 8, the slots having a communicating portion connecting the two slots. Bed roll 10 is secured to a shaft 12 (Fig. 3) which serves as the main shaft of the machine. It is driven by a worm gear 14 (Fig. 2) arranged to be constantly in mesh with a worm 15 on a shaft 16 carrying a pulley 18. The pulley is driven by a belt 20 which passes around a pulley on a motor shaft 22 of a motor 24. Secured to the shaft 12 is a sprocket wheel 26 (Fig. 3) around which passes a sprocket chain 28 engaged also with a sprocket wheel 30 on a shaft 32 to which is fastened the lower feeding-in roll 8. Hence the feeding-in roll 8 is positively driven and at substantially the same speed as the bed roll 10. Peripheral speed of bed roll 10 is slightly greater so as to keep the work taut. For cooperation with the lower feeding-in roll 8 there is provided an upper feeding-in roll 34 (Figs. 3, 4 and 5) which is driven through its frictional contact with the feeding-in roll 8 when no work is in the machine. When the forward edge of the piece of work is shoved into the bite between the rolls 8 and 34, the work is seized and fed into the machine because of the action of the top feeding-in roll 34 in pressing the work firmly upon the positively driven roll 8. At the same time the roll 34 is itself turned through frictional contact with the work. Shortly after engaging with the roll 8 the forward edge of the work reaches the bed roll 10 upon which it is pressed by a series of calipering wheels 36. Here, again, the work is fed by the positively driven roll 10 upon which it is pressed by the calipering wheels 36.

When the work passes between the bed roll 10 and the calipering wheels 36 (Figs. 3, 4 and 5) the latter are rotated through friction with the work and help in feeding the work in co-operation with the bed roll 10. Obviously the wheels 36 will be lifted from the bed roll 10 a distance corresponding to the thickness of the work. If the work were uniform in thickness the wheels would remain stationary in space while rotating during the feeding of the work. As a matter of fact, hides and skins vary considerably in thickness in closely adjacent highly localized areas from one end of the hide or skin to the other. Hence, as the wheels pass over the work they are constantly moving upwardly and downwardly in accordance with the constantly changing thickness dimensions of the work. Hence, the wheels 36 are calipering elements or thickness detecting elements. In order that the result of the calipering operations performed by the wheels 36 may be made known to the operator, indicating means is provided as will be hereinafter described.

Figure 1:
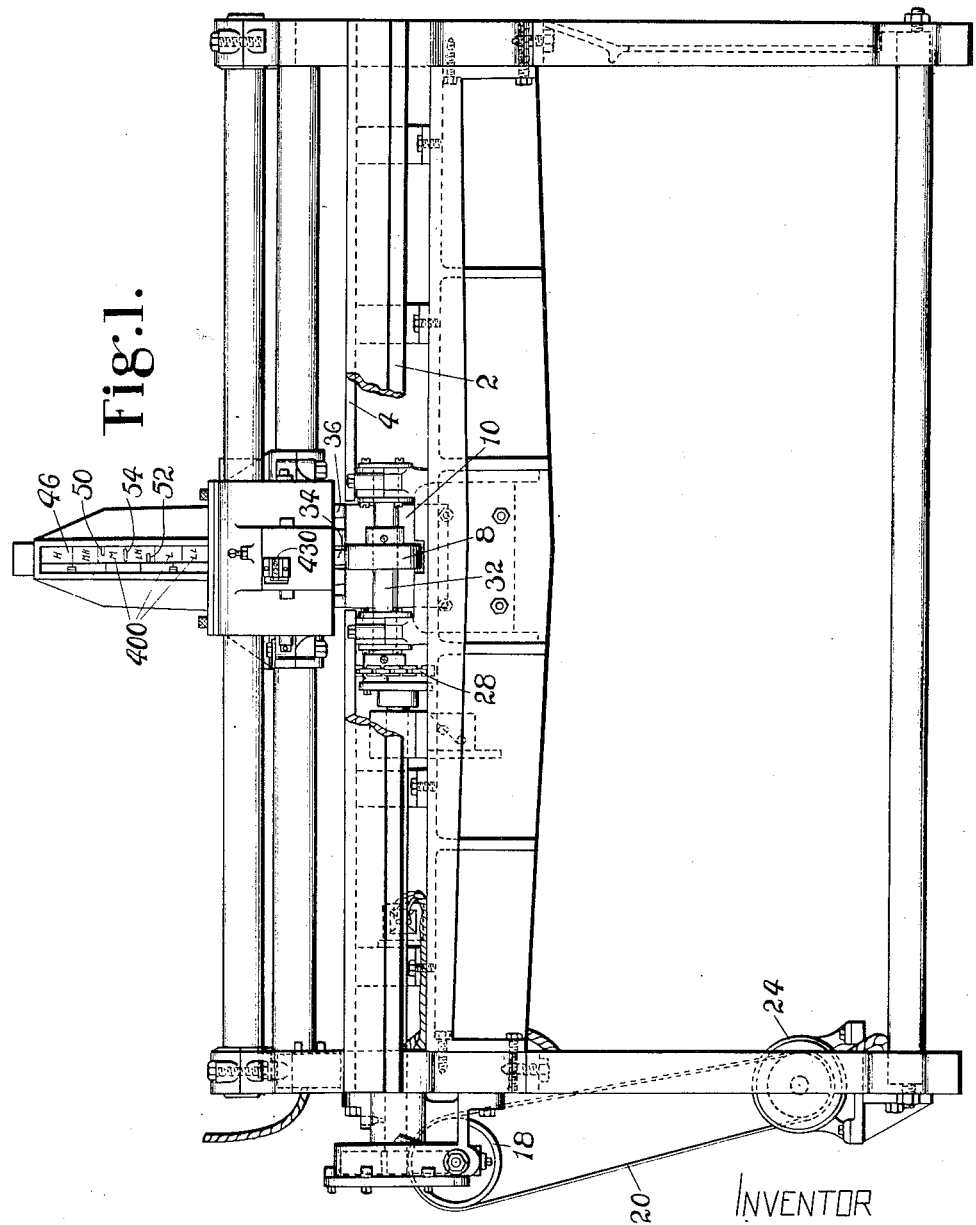
Fig. 1 is a view in front elevation of a thickness measuring machine illustrating one embodiment of the invention.

While various old and well-known types of indicating means might be used to indicate the measurements performed by the calipering wheels 36, there has been provided, because of its many advantages, an indicating means comprising reflectors or mirrors 40, 42, 44 (Fig. 15) arranged to direct beams of light upon a translucent glass 46 (Figs. 1 and 5) which carries numerals, or characters arbitrarily chosen to designate grades of thickness throughout the range of thickness dimensions of any given class of work. Upon reference to Fig. 1, it will be observed that the beams of light thrown upon the translucent glass 46 are in the form of bars of light, the upper bar of light 50 indicating the maximum thickness of the piece of work which has just passed through the machine, the bar 52 indicating the minimum thickness dimension found by the calipering wheels during the passage of the work, and the bar 54 indicating the average between the two thicknesses just mentioned.

The arrangement by which these bars of light 50, 52, 54 are thrown upon the semi-transparent glass 46 by the mirrors 44, 40 and 42, respectively, will now be described. Mounted in a casing 56 at the rear end of the machine is a source of light which, in the illustrated construction, is an incandescent lamp 58 (Figs. 4, 5 and 6). This lamp 58 is mounted in bracket members 60, 61 arranged to be adjusted in up and down directions on a base plate 63 (Fig. 6) through the adjusting bolt 62 and in lateral directions through an adjusting bolt 64 after securing screws 66 have been properly loosened, the bracket members 60, 61 being then secured in adjusted position by tightening of the securing screws 66. The lamp 58 may be accurately adjusted by the means described so as to position an incandescent filament 59 within the lamp bulb in line with a slot 70 (Figs. 4, 5 and 6) in a member 72 attached to front wall 74 of the casing 56. The light from the filament makes a brighter bar of light on the reflectors 40, 42, 44 than can be obtained from other parts of the lamp. As shown, most clearly in Fig. 5, the bar of light which passes through the slot 70 falls upon a parallel lens 76 (i. e., a lens for converting divergent rays to parallel) supported by a bracket 78 attached to the frame of the machine, the lens 76 being constructed to direct the rays passing therethrough into parallel rays which will fall in one long, narrow bar of light upon the three reflectors or mirrors 40, 42, and 44. From these mirrors, light is directed rearwardly and upwardly at an angle to a relatively long, upright mirror 80 (Fig. 5) at the rear end of a box 82, the angle at which the different bars of light from the reflectors or mirrors 40, 42 and 44 strike the mirror 80 being dependent upon the angle of adjustment of the mirrors 40, 42 and 44. From the mirror 80 the bars of light are reflected to the semi-transparent indicator glass 46, the light at 46 being in bright bars at different locations one above another, the bars of light together with indicating characters on the scale 48 giving the reading of the thickness dimensions to the operator.

It will be understood that the bar of light coming through the slot 70 is of a length which corresponds to the distance from the outside edge of the reflector or mirror 40 to the outside edge of the mirror 44 and that only those portions of the bar of light which strike the reflectors or mirrors 40, 42 and 44 are reflected to the mirror 80. Furthermore, while the mirror 42 is adjustable so as to have its reflecting surface in various planes, the latter all intersect the parallel rays from the lens 76 at right angles to said parallel rays. The result is that the bar of light from the mirror 42 extends entirely across or substantially across the indicator glass 46, as shown at 54 in Fig. 1 of the drawings. However, the mirrors 40 and 44 are adjusted so that the faces of the mirrors are in planes which intersect the parallel rays of the lens 76 at angles other than a right angle. In other words, the mirror 40 is set obliquely to the parallel rays from the lens 76 so that the bar of light from this mirror is located at the left at 52 in Fig. 1 while the bar of light from the mirror 44 is located at the right at 50 in Fig. 1. It is to be understood that the mirrors 40 and 42 might be located with their faces or reflecting surfaces at a right angle to the parallel rays coming from the lens 76 in which case the bars of light at 50 and 52 (Fig. 1) would extend clear across the indicator plate 46. The purpose of having the mirrors 40 and 44 tipped at an angle is to provide some distinguishing characteristic between the different bars of light 50, 52 and 54 in which, as stated above, the bar 50 indicates the maximum thickness of the work, the bar 52 the minimum thickness of the work and the bar 54 the average thickness of the work. It sometimes happens that two or more of these bars will be very close together, in fact, almost overlapping, so that it is a distinct advantage to have the bars distinguishable by differences in length as well as in position, as disclosed in Fig. 1. Adjustment of the mirrors 40 and 42 is secured by screws one of which is shown at 55 (Fig. 15).

Each of the mirrors 40, 42 and 44 (Fig. 15) is mounted in a holder 90, 92 and 94, respectively, the holders being pivoted freely upon a pivot bar 96 carried by a bracket 98 (Fig. 5). At their rear ends the mirror holders 90, 92 and 94 each carries a cross pin 100 (Fig. 15). These cross pins are engaged each by a cam-faced lever 102, 104, 106 corresponding respectively to the mirrors 40, 42 and 44. When the levers 102, 104, 106 are moved toward the cross pins 100, the cam faces of the levers center the cross pins at or closely adjacent to the intersection of the two curved cam surfaces on each lever. Following such engagement of the levers 102, 104 and 106 with the cross pins 100, upward or downward movement of the levers will adjust the mirror holders 90, 92, and 94 about their pivot points and thus tip the mirrors 40, 42 and 44, respectively, so as to throw the bar of light at a higher or at a lower level on the indicator plate 46. Normally, when the machine is at rest the levers 102, 104, and 106 are out of contact with the cross pins 100. Hence, when a piece of work enters the machine the levers 102, 104, 106 must be moved to operative position in engagement with the cross pins 100, in order that the indicating mechanism may be ready to perform its indicating function.

The means for thus operatively positioning the levers 102, 104, and 106 comprises a work controlled member which, in the illustrated machine, is the upper feeding-in roll 34 (Fig. 5). This roll 34 is carried by a yoke arm 110 (Figs. 5, 7 and 11) pivoted freely at 112 on the frame of the machine to permit up-and-down movement of the roll 34 as the latter encounters thicker and thinner spots in the work and as it is lifted by the forward edge of the work and dropped as the rear edge of the work passes out from between the two feeding-in rolls 8 and 34. Preferably and as shown, the free end of the arm 110 is yieldingly pressed down by a rod 111 (Fig. 5) slidable in a casing 113 and pressed down upon by a spring 115, the pressure of the spring being regulated by manipulation of a threaded bolt 117. The lower end of the rod 111 contacts with an extended portion of a pivot pin 119 mounted in the end of the arm 110. By this means the feeding-in roll 34 is pressed against work passing over the lower roll 8 with pressure sufficient to ensure proper feeding of the work. Upon inspection of Figs. 5, 7 and 8 of the drawings it will be observed that the roll 34 is pinned to a shaft 114 mounted for rotation in the supporting yoke arm 110. Pinned to one face of the roll 34 is a disk 116 (Fig. 8) adapted to serve as a friction disk in conjunction with an annular disk of leather 118 set in the face of a friction clutch member 120, the member 120 with its friction ring 118 being pressed against the disk 116 by a spring 122 interposed between the adjacent side of the supporting arm 110 and a pinion 124 which is pinned to the clutch member 120. In mesh with the pinion 124 is a toothed wheel 126 (Figs. 5 and 7) mounted to rotate upon a shaft 127 journaled in the two side portions of the yoke arm 110. It will be understood that when the toothed wheel 126 is free to rotate it will be driven from the feeding-in wheel 34 through the friction clutch formed by the disk 116 and the clutch member 120 to the latter of which is secured the pinion 124 arranged to be constantly in mesh with the wheel 126. If, however, the toothed wheel 126 be locked against movement, the feed-in roll 34 may still rotate while the friction clutch members already referred to slip relatively to each other.

Figure 9:
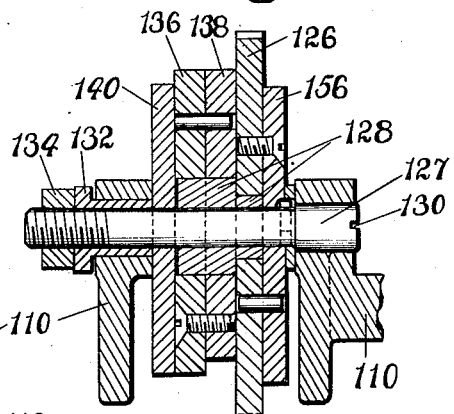
Fig. 9 is a sectional view along the line IX—IX of Fig. 7.

The toothed wheel 126 is locked against movement at certain predetermined times as will hereinafter be described. Upon reference to Fig. 9 it will be observed that the toothed wheel 126 is mounted upon a sleeve 128 rotatable upon the short shaft 127 in the side arms of the supporting yoke arm 110. At one end the shaft 127 is provided with a slot 130 so that it may be readily engaged by a tool, such as a screw driver, to be rotated thereby. The other end of the shaft 127 is provided with a sleeve 132 which rests within the bearing in the yoke arm 110, a nut 134 being screw threaded upon the end of the shaft 127 and rotatable to force the sleeve 132 to the right in Fig. 9 thereby effectively clamping the toothed wheel 126 to other members also carried by the sleeve 128 and the shaft 127, as will now be described. Screwed and pinned to each other is a pair of cam members 136, 138 both mounted on the sleeve 128 for rotation upon the shaft 127. Also mounted upon the shaft 127 is a disk 140 (Figs. 7 and 9) which is provided with a locking shoulder 142 (Fig. 7) adapted to be engaged by a locking pawl 144 pivoted on the pivot pin 119 in the forward end of the yoke arm 110, said locking pawl 144 having an extension 148 beyond the pivot 119, the extension 148 having a downwardly facing surface arranged to engage an upwardly facing surface on a stop member 150 (Figs. 4, 5, and 11) mounted in the frame of the machine, the arrangement being such that when the roll 34 drops off the rear end of the work the locking lever 144 is operated through contact with the stop 150 to withdraw its operative end out of the path of the locking shoulder 142, thereby permitting rotation of the members mounted on the shaft 127 and the sleeve 128 including the toothed wheel 126 which is in mesh with the pinion 124.

Pivotally mounted on the pin 119 is a second locking pawl 152 (Figs. 5 and 7) having a hook end for engagement with a locking shoulder 154 on a disk 156 which is secured to the toothed wheel 126. The pawls 144 and 152 are held yieldingly in their operative positions by a single spring 157. As most clearly shown in Figs. 5 and 7, the locking pawl 152 has an extension 158 upon the other side of the pivot 119, the extension 158 having an upwardly facing surface for engagement with a stop 160 (Figs. 4, 5 and 11) mounted in the frame of the machine. It will be clear from Fig. 5 that, on upward movement of the feeding-in wheel 34 due to entrance of the work, the locking pawl 152 will be tripped by engagement of the extension 158 on the pawl with the stop 160 whereby rotation of the toothed wheel 126 and of the cam members 136 and 138 will be allowed to take place.

While the stops 150, 160 might be provided as fixed parts of the frame of the machine they are shown in Figs. 4, 5 and 11 as parts of members pivotally mounted for adjustment upon a pivot 162, portions of the stops 150, 160 being extended upwardly beyond the pivot 162. The upwardly extending arm 163 of stop 150 is arranged to engage the head end of a bolt 164 (Fig. 11) by which the position of the stop 150 may be adjusted while the arm 163 thereof is held against the bolt 164 by a spring 165, said adjustment being secured by proper manipulation of the bolt 164 and of nuts 166, 168. The spring 165 also holds the stop 160 against an adjustable bolt 169.

Figure 7:
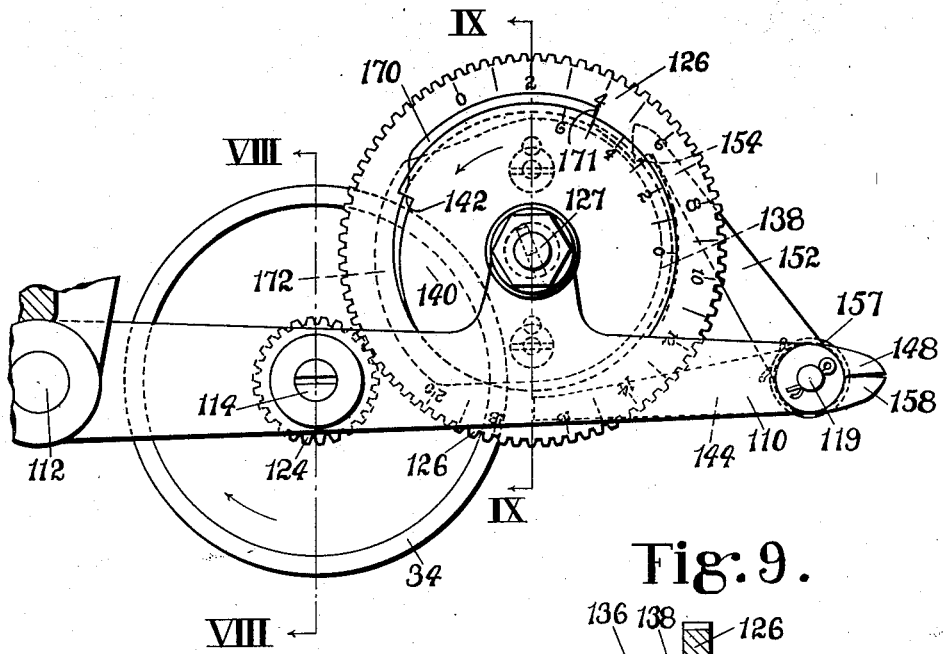
Fig. 7 is an enlarged view of a feeding-in roll and cam mechanism controlled thereby.
Figure 8:
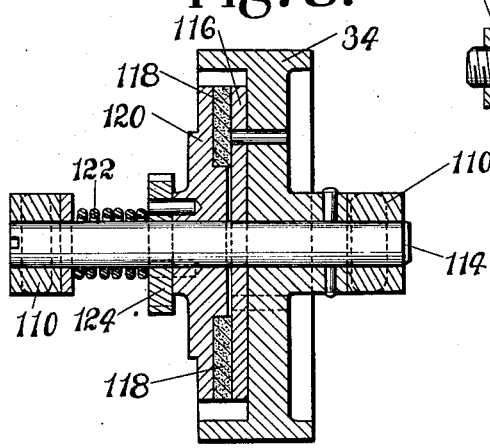
Fig. 8 is a section on the line VIII—VIII of Fig. 7.

As most clearly shown in Fig. 7, the cam member 136 has a cam surface 170 provided with a shoulder 171, while the cam member 138 carries a cam 172. Upon rotation of the toothed wheel 126 and the cam members 136, 138, the cam 172 engages the lower end of a lever 176 (Figs. 5 and 15). Immediately following the operation of the cam 172 upon lever 176, the cam 170 operates a lever 174 for purposes which will be hereinafter described. Taking up now lever 174, it will be observed that its upper end engages a pin 178 (Figs. 5 and 15) rotatably mounted in an arm 180 rigid with a rocking sleeve 182 (Fig. 15) which is rotatably mounted upon a shaft 184 carried by a bracket 186 rigid with the machine frame. Rotation of the rocking sleeve 182 by the lever 174 is resisted by a spring 187 which operates to keep the pin 178 pressed against the lever 174. Hence, as the lever 174 moves to its initial position the spring 187 returns the rocking sleeve 182 yieldingly to its initial position. Carried by the rocking sleeve 182 is a finger 188 rigid with the sleeve, the finger having sockets for the front ends of three rods 190, 192, 194; the other ends of these rods being seated in sockets in the lower ends of the levers 102, 104, 106, respectively. It will be noted that the three rods 190, 192, 194 have pins 196 at each end which project through openings in the finger 188 in line with the sockets therein, the pins at the other ends of the rods 190, 192, 194 projecting through perforations in the sockets in the lower ends of the levers 102, 104, 106, the purpose being to prevent undesirable displacement of the rods 190, 192, 194 with respect to their supporting members. Extending between the finger 188 and the lower ends of levers 102, 104, 106 are springs 198, 200, 202. It will be readily understood that the rods 190, 192, 194, together with the springs 198, 200, 202 constitute connections between the finger 188 and the levers 102, 104, 106 for operating the latter without any tendency of the parts to bind with respect to each other. When the rocking sleeve 182 is operated by the lever 174, the levers 102, 104, 106 are rocked about their pivot points to cause them to engage the cross pins 100 mounted in the mirror holders 90, 92, 94, respectively. In this way the first portion of the rotation of the feeding-in wheel 34 is caused to move the mirror operating devices, comprising said levers 102, 104, and 106, to operative position so that the mirrors may be responsive to the movements of the work calipering means as will hereinafter be described.

The calipering wheels 36, four in number in the ilustrated machine, are each mounted rotatably in a yoke member 210 (Figs. 4 and 5). The yoke members are rotatably mounted at their front ends upon a common shaft 212 fixed in an enclosing yoke support 213, (Figs. 4 and 5) the pivots for the yoke support 213 being at 214, 216, the other end of the yoke support 213 resting upon set screws 218 (Fig. 5) adjustably mounted in a cross bar 220 carried rigidly by the machine frame. In order to prevent undue vibration of the yoke support 213, there is provided a number of springs 222 (Fig. 5) arranged to hold the support 213 yieldingly in contact with the upper ends of the set screws 218.

At their free ends each yoke member 210 (Figs. 4, 5, 10) is provided with two projections, one projection 224 (Figs. 4 and 10) facing upwardly and the other projection 226 (Fig. 10) facing downwardly. The upwardly facing projection 224 is in engagement with a downwardly facing finger 228 (Figs. 10 and 16) on a finger lever 230 (Figs. 4, 5, 10 and 16), which may be termed a thickness transmitting member. Since there are four upwardly facing projections 224, there are four fingers 228 upon the finger lever 230. Since each calipering wheel 36 is independently mounted through its yoke member 210, the finger lever 230 may be moved upwardly by any one of the wheels 36. This finger lever 230 is mounted upon a shaft 232 (Fig. 10) and is provided with a lifting arm 234 (Fig. 16) upon which rests a connecting rod 236, the upper end of which contacts with a set screw 238 (Fig. 12) carried by one arm of a bell crank lever 240 having a vertical arm 242 for transmitting movements of the connecting rod 236, as will be hereinafter described. For keeping the set screw 238 pressed against the upper end of the connecting rod 236 there is provided a spring 243 connected to a stationary part of the machine at one end and at its other end to the bell crank lever 240 below its pivotal support. The downwardly facing projections 226 on the yoke members 210 (Figs. 4, 5 and 10) rest upon fingers 250 (Figs. 10 and 17) formed on a finger lever 252 carried by the shaft 232. Preferably and as shown, the yoke members 210 are held down yieldingly on the fingers 250 by springs 253 (Figs. 5 and 10), one for each yoke member 210. Since there are four downwardly facing projections 226, one on each yoke arm 210, there are four corresponding upwardly facing fingers 250 on the finger member 252, which may also be termed a thickness transmitting member. Rigid with the finger member 252 is an arm 254 (Fig. 17) to which is pivoted a ling 256 having pivoted at its upper end a connecting rod 258 having at its upper end pivotal connection with horizontal arm 260 (Fig. 12) of a bell crank lever 262 which has a downwardly projecting substantially vertical arm 264 corresponding to the vertical arm 242 of the bell crank lever 240. As shown in Fig. 12, the pivotal connection between the connecting rod 258 and the horizontal arm 260 of the bell crank 262 comprises an eye member 266, the eye surrounding the upper end of the connecting rod 258 and having a shank portion rotatable within the end of the horizontal arm 260. Since the connecting rod 258 is connected to the finger lever 252 to be moved downwardly by any one or more of the yoke arms 210 which carry the calipering wheels 36, it is clear that the connecting rod 258 will be pulled downwardly, by a downwardly facing projection 226 on a yoke member 210 (Figs. 4, 5, 10 and 17), each time that one of the wheels 36 comes to a spot in the work thinner than any before encountered in paths of the wheels. On the contrary the connecting rod 236 (Figs. 12 and 16), since it is lifted by the finger lever 230 (Figs. 4, 5, 10 and 16), each time that one or more of the yoke members 210 is lifted by its associated calipering wheel, finally reaches a position determined by the thickest spot in the paths of wheels on the work.

The connections between the connecting rods 236, 258 and the vertically positioned arms 242 and 264 of the bell cranks 240 and 262 respectively have already been described. These connections comprise part of the means for connecting the rods 236 and 258 to the mirrors 44 and 40, respectively, so that the maximum thickness dimension and the minimum thickness dimensions, respectively, may be indicated on the indicator plate 46. This means comprises a sleeve 270 (Fig. 12) fastened to a shaft 272, the sleeve having two arms 274, 276. In the end of the arm 274 there is pivoted a carrier block 278 for a rod 280 having a slotted portion for receiving a pin 282 by which the rod 280 is slidably connected within its carrier block 278. While the rod 280 may have been made in one piece, it is preferably made in two pieces of which the piece 284 is adjustably joined to the other by being screw-threaded into a box 286 whereby the length of the combined pieces may be made readily adjustable. At its other end the rod piece 284 (Figs. 5 and 15) is provided with a ball portion receivable in a socket in a downwardly extending arm 286 of a bell crank lever 288, a horizontal arm 290 of which carries the lever 106. For holding the ball end of the rod 284 in its socket in the arm 286 there is provided a spring 292. At its other end (Fig. 12) the two-part rod 280 contacts with a hardened plug 294 (Figs. 12 and 13) in the vertical arm or plate 242. It will be readily understood that, upon lifting the connecting rod 236, the compound rod 280 will be moved to the left in Figs. 12 and 15 whereby the bell crank lever 288 is rocked to depress the lever 106. In this way the mirror 44 in the holder 94 is elevated to throw its beam of light higher on the indicator plate 46. It is clear that the thicker the work the higher the mirror 44 is lifted and the higher the beam of light, corresponding to the mirror 44, appears on the indicator scale 46, 48.

As before stated, the connecting rod 258 (Figs. 12 and 17) operates to move the plate 264 (Fig. 12) which is similar in all respects to the plate 242. Mounted for engagement with the plate 264 is a compound rod 300, 302 having a slot therein within which is located a pin 304 fixed in a carrier block 306 which is pivotally supported at the end of the arm 276 (Fig. 12). The compound rod 300, 302 is similar in its construction and in its mounting to the compound rod 280. At its other end (Fig. 15) the compound rod 300, 302 is provided with a ball end for reception in a socket in the lower end of an arm 308 of a bell crank lever 310 whose horizontal arm 312 carries a pivot for the lever 102. For holding the compound rod 300, 302 in its socket in the arm 308, there is provided a spring 314 and for holding the plate 264 (Fig. 12) against the other end of the compound rod 300, 302 there is provided a spring 316. It will be clear from the description of the connections between the connecting rod 258 (Fig. 12) and the lever 102 (Fig. 15) that downward movement of the connecting rod 258 will be followed by upward movement of the lever 102, and hence the mirror 40 will be lowered to throw its beam lower down on the indicating plate 46 and scale 48. It follows from the foregoing description that upward movement of one or more of the calipering wheels 36 causes upward movement of the connecting rod 236 and hence of the mirror 44, while downward movement of one or more of the calipering wheels 36 causes downward movement of the connecting rod 258 and hence of the mirror 40, with corresponding effects upon the beams of light indicating the thickness dimensions on the indicator plate 46 and scale 48.

In order that the connecting rods 236 and 258 (Figs. 12, 16 and 17) shall move each in one direction only, during the measuring operation on a piece of work, there is provided a friction clutch shown in detail in Figs. 12 and 14. As illustrated, the connecting rods 236 and 258 pass slidably through a bar 320 which, as shown, constitutes a part of the frame of the machine. This bar 320 is cut away at an intermediate portion to provide a slot for the reception of a squared portion 322 of a rod 324. Mounted in a circular slot in the squared portion of the rod 324 is a short cylinder 326 having beveled ends to grip the rod 236 and the rod 258. For causing a yielding grip on the rods 236 and 258 there is provided a spring 328 (Figs. 4, 5, 10 and 12) interposed between lock nuts 330 on the end of the rod 324 and the adjacent surface of a cross bar 332 rigid with the machine frame. The pressure exerted on the cylinder 326 (Fig. 14) by the spring 328 is sufficient to keep the rod 236 from descending if the calipering wheels fail to keep the finger lever 230 (Figs. 5, 10 and 16) with its arm 234 against the lower end of the connecting rod 236. In other words, the connecting rod 236 is moved only in an upward direction during the calipering operations. Since the connecting rod 236 retains its place after each upward movement due to one or more of the calipering wheels mounting a thicker spot in the work than any theretofore encountered, it follows that the rod 236 reaches an upper position corresponding to the thickest dimension of the work in the path of the calipering wheels and that it maintains this position. It follows that the mirror 44 also maintains this position until released in a manner hereinafter described. In this way the mirror 44 is instrumental in indicating, by a beam of light on the indicator plate 46, the maximum thickness dimension of the work in the paths of the calipering wheels.

The action of the friction clutch shown in detail in Fig. 14 on the connecting rod 258 is similar to that described in connection with the connecting rod 236 but with this difference, that the connecting rod 258 (Figs. 12 and 17) is moved downwardly at each new decrease in the thickness dimension detected by one or more of the calipering wheels but it does not move up again when one or more of the wheels strikes a thicker spot. This is true for the reason that the finger lever 252 (Figs. 5 and 17) is moved in the downward direction only by the wheels 36 since the wheels operate on the finger lever 252 through downwardly facing surfaces on the projections 226. Hence, if the wheels 36 and the yoke members 210 move upwardly they simply move away from the finger lever 252. It follows that the connecting rod 258 is moved downwardly during the calipering operation and is maintained by the friction cylinder 326 (Fig. 14) in the lowest position reached during the passage of the piece of work. Since this connecting rod 258 has connections to the mirror 40 it follows that the mirror moves to indicating position and is held in such position so that at the end of the measuring operation it records the minimum thickness dimension found by the calipering or detector wheels 36.

Means is provided in the illustrated machine for indicating the average of the thickness dimensions found by the mechanisms above described. For this purpose there are provided connections from the levers 102 and 106 (Fig. 15) to the lever 104. These connections comprise an equalizing or averaging lever 340 (Fig. 15) pivotally connected at its center by a pin 342 to the lever 104, the pin extending rearwardly from the lever 104. At its ends and at equal distances from its center, the averaging lever 340 rests upon a pin 344 in the lever 106 and a pin 346 in the lever 102, springs 348 being provided to connect the ends of the lever 340 to the adjacent pin 344 or 346. The lever 104 is pivotally supported in an arm 350 pivoted on the shaft 184. It will be noted that this arm 350 has no downwardly extending arm similar to arms 286, 308 which are rigid with the horizontal arms 290, 312 respectively. It is clear, therefore, that all movements of the lever 104 come from the levers 102, 106 and represent an averaging of the movements of the levers 102 and 106. It follows that at the end of the measuring operations the position of the lever 104 will be halfway between the positions of the levers 102 and 106. Therefore, the mirror 42 operated by lever 104 indicates, by its light beam on the indicator plate 46, the average dimension of the work.

From what has been said in the preceding paragraphs it is clear that the connecting rods 236, 258 (Fig. 12) and the mirrors 40, 42 and 44 (Fig. 15) are held in measurement indicating position at the end of a measuring operation upon a given piece of work. Means is, therefore, provided for releasing the connecting rods 236, 258 (Fig. 12) early in the entrance of a fresh piece of work into the machine. As above described the lever 176 (Fig. 5) is arranged to be operated by a cam 172 (Fig. 7) which becomes operative for the purpose a variable time after the feed-in roll 34 is lifted by the entrance of a piece of work. The cam 172 (Fig. 7) causes movement of the lower end of the lever 176 to the right in Fig. 5 whereby the upper end of the same lever is moved to the left. To the upper end of the lever 176 there is pivoted at one end a long connecting rod 360 (Figs. 4, 5, 10 and 12) the other end of which is pivoted at 362 (Fig. 10) to a lever 364 movable about a vertical pivot 366, the lever 364 having an end 368 (Figs. 10 and 12) engaged with a shoulder 370 on the rod 324. Movement of the lever 176 by the cam 172 (Fig. 5) causes, through the rod 360, movement of the rod 324 to the left in Fig. 12 against the tension of the spring 328. By this movement of the rod 324 the connecting rods 236 and 258 are released, since the wedge cylinder 326 (Figs. 12 and 14) is moved away from said rods, with the result that they are free for a predetermined period to be adjusted to the thickness of the work where it is to be calipered at the front end of the new incoming piece of work. As soon, however, as the cam 172 passes by the lower end of the lever 176 the spring 328 returns all of the connected parts including the rod 324 to gripping position with respect to the connecting rods 236, 258. Thenceforth these connecting rods 236, 258 can move only in one direction, the rod 236 upwardly and the rod 258 downwardly, as before described. When the rods 236 and 258 are released, the bell crank 262 (Fig. 12) follows the movement of the rod 258 under the action of the spring 316. Similarly, the bell crank 240 (Fig. 12) follows the rod 236 under the action of the spring 243. When the bell cranks 240 and 262 follow the movements of the connecting rods 236 and 258, respectively, upon the introduction of a fresh piece of work, as above described, the compound rods 280 and 300, 302, respectively, follow the downwardly extending arms 242, 264, of their respective bell cranks under the action of springs 380, 382 each attached at one end to the downwardly extending arm of bell cranks 288 and 310, respectively, (Fig. 15), these springs 380, 382 being attached at their other ends to a cross bar of the machine frame. Hence, the levers 102, 104 and 106 are adjusted to the thickness dimensions at the forward end of a new piece of work.

In the operation of the machine a piece of work is introduced over the feeding-in table 2 and shoved over the work supporting table 4 until it reaches the feeding-in rolls 8 and 34. When this occurs the upper feeding-in roll 34 is lifted as it rides up on the forward edge of the piece of work. When it is lifted, the pawl 152 (Figs. 5 and 7) is moved to inoperative position, thus releasing the toothed wheel 126 and the cam disks 136, 138 and shouldered disks 140, 156, for rotation by the frictionally driven pinion 124 on the shaft 114 of the feeding-in roll 34. At a predetermined but variable time after the beginning of the rotation of the cam disks 136, 138, the cam 172 causes operation of the lever 176 and rod 360 (Fig. 5) whereby the connecting rods 236, 258 (Figs. 12, 16 and 17) are released from the friction clutch cylinder 326 (Figs. 12 and 14) so that they are free to respond to movements of the calipering wheels. At this instant, the lever 174 is operated by the cam 170 to cause engagement of the levers 102, 104, 106 (Fig. 15) with the mirror holders 90, 92, 94 respectively, thus placing that part of the mechanism shown in Fig. 15 in operative condition. An instant later the lever 176 is released by the cam 172 on the cam disk 138 (Figs. 7 and 9) whereupon the spring 328 (Fig. 12) immediately reapplies the friction clutch to the vertically arranged connecting rods 236, 258. The cam disks 136, 138 stop with the cam 170 in position to hold the lever 174 in operative position. With said rods 236, 258 thus frictionally held by the friction clutch 326 (Fig. 14) they each move in one direction only, the rod 236 in an upward direction usually in successive steps until the maximum thickness dimension of the work in the paths of the calipering wheels 36 has passed said wheels while the connecting rod 258 moves only in a downward direction in one or more steps to record the minimum thickness dimension of the piece of work in the paths of the calipering wheels 36. It will be understood that the lever 174 is held by cam 170 in its operative position during all indicating operations. Through the described connections between the connecting rods 236 and 258 and the mirrors 44 and 40, respectively, beams of light are thrown on the indicator plate 46 to indicate the maximum and the minimum thickness dimension of the piece of work being measured. Located between the mirrors 40 and 44 as already described is the mirror 42 which is caused to move halfway between the mirrors 44 and 40. Hence, the beam from this mirror 42 will show on the indicator plate 46 the average thickness dimension of the piece of work.

As already stated, the best portions of hides and skins are located inwardly of the flank portions and along each side of the backbone line beginning at a considerable but variable distance from the front end of the hide or skin and ending at a variable distance from the rear end of the hide or skin. In some skins, the head and neck portions at the front end of the skin are thicker but of looser texture than the middle back portions of the same hide or skin. In other cases, the neck portions may be thinner and of poorer quality than the back portions of the same hide or skin. The extreme rear end portion of the butt end of the hide or skin may be of a lower quality than those portions a little further forward. On the other hand all that portion of the body part of the hide or skin lying on each side of the backbone line, back of the head and neck portions and in front of the extreme rear end portion, are of a finer quality of leather, finer grain and of a denser fiber. Hence, in measuring hides and skins for their thickness dimensions in order to assort them into various grades or classes according to thickness, it is desirable to measure the best portions of the leather and not to grade the hides or skins on thickness dimensions found in less desirable, or possibly, inferior portions of the hides and skins. For this reason means is provided in the illustrated machine for taking the measurements only in an intermediate portion of each hide or skin. In calf skins, for instance, it is preferred to start from ten to eighteen inches from the forward edge depending upon the range of sizes in the batch being measured, whereas in measuring sheep skins the distance is usually from eight to twelve inches from the front or head end. To accommodate the machine to these and other differences in the unmeasured portions at the front end of the skin, the cam disks 136, 138 (Figs. 7 and 9) carrying cams 172, 170, respectively, and the shouldered disk 140 are adjustable with respect to the toothed wheel 126. To make the adjustment a screw driver or a nut wrench may be used to turn the supporting shaft 127 (Figs. 7 and 9) to loosen the nut 134 and the sleeve 132. When the sleeve 132 is loosened, the two cam members 136, 138 may be adjusted simultaneously with respect to the toothed wheel 126, the toothed wheel 126 carrying a scale and numerals (from 0 to 20) indicating a range of from zero to twenty inches in addition to the six-inch distance between the bite of the wheels 8 and 34 and the bite of the calipering wheels 36 and the bed roll 10, which distance, in the illustrated construction, is fixed. By this adjustment the length of the cam 170 or of the cam 172 is not changed but the distances through which these cams must rotate before they operate upon the levers 174 and 176 to initiate the indicating operations is determined by the adjustments described. In making the adjustments, the shoulder 171 on the cam 170 is moved relatively to the scale marks on the toothed wheel 126. The cam disks 136, 138 and the toothed wheel 126 are moved a certain distance, predetermined by adjustment as just described, to effect the initiation of indicating operations. The piece of work may be moving over the bed roll 10 and the calipering wheels moving in accordance with the thickness of the work but no measurements are indicated until the cams 170 and 172 on disks 136 and 138, respectively, have operated levers 174 and 176, respectively. Then they are held against further rotation by engagement of the shoulder 142 with the stop pawl 144. The purpose of this arrangement is to hold the lever 174 in operative position through the cam 170. As long as the lever 174 is held by the cam 170, the levers 102, 104, 106 (Fig. 15) are held in operative relation to the mirror holders 90, 92 and 94, respectively. This lasts during the measurement of the work throughout the predetermined portion within which measurements are made for the given piece of work undergoing measurements. When the rear end of the work passes away from the bite between the feed-in rolls 8 and 34, the feed-in roll 34 drops down to the level of the work supporting table and in doing so the locking pawl 144 (Figs. 5 and 7) is removed from the shoulder 142 whereupon the cam disks 136, 138 and the toothed wheel 126 (Figs. 7 and 9) all begin rotating again. After a predetermined controllable time, the cam 170 operates to permit the lever 174 to release the mechanism of Fig. 15 whereby the levers 102, 104 and 106 are moved to inoperative positions with respect to the mirror holders 90, 92, 94, such inoperative position being shown in Fig. 15, the mirrors 40, 42, 44 being held in their indicating positions frictionally by spring members 390 (Fig. 15) which engage the mirror holders 90, 92 and 94. After the cam disks 136, 138 have moved far enough to release the lever 174 they are brought to a standstill through the engagement of the lock pawl 152 with the locking shoulder 154 (Figs. 5 and 7). In this way measurements continue to be taken during the travel of the cam disks 136, 138 for a predetermined time after the feed-in roll 34 drops off of the rear end of the work. In order to vary the unmeasured portion at the rear end of the piece of work, the shouldered disk 140 may be adjusted to change as desired the distance of the shoulder 142 on the disk 140 with respect to the cam 170 so that the cam operates sooner or later after release of the shoulder 140 by the pawl 144. To guide the adjustment, the disk 140 carries a scale and indicating numerals from 0 to 6. The disk 140 is adjusted with respect to the shoulder 171 on the cam 170.

In finishing operations upon calf and kip skins it is common practice to shave the flesh surfaces in order to reduce the thickness of the thicker portions and in this way lighten the skins so that they may be utilized in the manufacture of light leather articles such as shoe uppers. This shaving should be performed in such a manner as to secure substantially the same thickness dimension over considerable areas with a very gradual increase of the thickness dimension as the thicker and denser portions of the skin are approached. In other words, no attempt is made to reduce the whole skin to substantially the same thickness dimension. In cutting such a skin for shoe uppers, for instance, care is taken to cut the upper portions for the two shoes of each pair in substantially the same locations so that they will match in weight, i. e., in thickness. While uppers of different thickness may be obtained from the same skin, it is the purpose in weighting the skin for sorting or grading to weight it in accordance with the thickness dimension of the most desirable portions of the skin which, as already stated, lie along each side of the backbone line in an area which begins a substantial distance from the front or head end of the skin and terminates short of the rear end. A shaved kip skin will vary in its thickness from about 20 to 55 thousandths of an inch, whereas a shaved calf skin will vary from about 10 to 70 thousandths of an inch. Sheep skins, shaved or unshaved, vary from about 10 to 70 thousandths, whereas kid and goat vary from about 7 to 42 thousandths. If the machine shown in the drawings were utilized in measuring all of these different classes of skins without any adjustment of the indicating means it is clear that in measuring kid and goat skins only the lower half of the indicator plate 46 would be used, whereas if the indicator mechanism were so adjusted as to utilize the whole of the indicator plate 46 differences in thickness in the skin undergoing measurement would be indicated in correspondingly wider range of the light beam positions on the indicator plate 46. This renders the reading of the indicating means more accurate by facilitating correct reading of the results. It will be understood, therefore, that the measurements indicated by the indicator plate 46 are not in thousandths of an inch but by characters arbitrarily chosen to represent various degrees of thickness such as LL for very light, LM for light medium, M for medium, MH for medium heavy, and H for heavy. These different combinations of characters are shown at 400 (Fig. 1) upon the indicator plate 46. Since they must be differently placed when measuring the different classes of skins, the indicator plate may be readily removed and another substituted therefor.

In order to adjust the indicating mechanism in the manner and for the purpose stated above, the shaft 272 (Fig. 12) is mounted in the frame of the machine so that one end portion extends beyond the frame and has attached thereto a lever 404 (Figs. 3 and 4). At its free end the lever 404 is provided with a hand piece or knob 406 which carries a pin 408 that may be withdrawn in a known manner and again entered into any one of several openings 410 in an arcuate member 412, the purpose of the pin 408 and of the holes 410 being to hold the lever 404 releasably in adjusted position. Upon reference to Fig. 4 it will be seen that the pin 408 is held yieldingly in any one of the openings or holes 410 by means of a spring 414. When the lever 404 is located with the pin 408 in hole number 1, counting from the top of the series of holes 410, the ends of the compound levers 280, 284 and 300, 302 (Fig. 12) are located in contact with hardened plugs 420 (Fig. 13) in the vertically arranged plates 242, 264 (Figs. 12 and 13). The indicating means is then adjusted for indicating measurements upon calf and sheep skins. If it is desired to measure kid and goat skins, the lever 404 is shifted to No. 2 of the openings 410. When the lever is thus shifted the shaft 272 is rotated in a counterclockwise direction (Fig. 12) to depress the arms 274, 276 (Fig. 12) whereby the associated compound rods 280, 284 and 300, 302 are lowered to bring their ends opposite to the hardened plug 294. The hardened plug 420 is in the form of a set screw, the set screw being used for this purpose so that the plug may be adjusted to bring it into proper relation to the end of the associated compound rod 280, 284 or 300, 302. When the compound rods 280, 284 and 300, 302 are in co-operative relation with respect to plugs 420 in the plates 242, 264 (Fig. 12), upward movements of the calipering wheel controlled rods 236, 258 will cause a less movement of the connecting rods and, therefore, of the mirrors and of the beams of light on the indicator plate 46 than was the case when the plugs 294 were in position opposite the compound rods 280, 284 and 300, 302, it being clear that movements of the beams of light must be less when it is desired to measure a greater range of thicknesses within the same space on the indicator plate 46 as compared to the measurement of a lesser range of thicknesses in the same space as before.

When it is desired to measure skins with a still wider range of actual thickness measurements than sheep and calf, as for instance kip, the lever 404 is pulled out to the right in Fig. 4 so as to bring the ends of the compound rods 280, 284 and 300, 302 opposite to hardened plugs 422 set back in recesses 424 (Fig. 13) in the plates 242, 264. When it is desired to move the lever 404 with the shaft 272 in the manner just described, the said lever 404 must first be moved downwardly in Fig. 3 to a position wherein a plate 423 fastened to the lever will be free from a second plate 425 secured to the frame of the machine, the plate 423 being normally positioned under the plate 425 as shown in Figs. 3 and 4, when the member 404 is in the position shown in said figures. When the plate 423 is freed from the overlying plate 425 by the downward movement of the lever 404, the latter may be pulled to the right in Fig. 4, thus moving the shaft 272 in the same direction after which the lever may be moved upwardly again in Fig. 3 until the pin 408 rests in the opening 410. In this position of the lever 404 and of the shaft 272, the compound rods 280, 284, 300, 302 are positioned opposite to hardened plugs 422 (Fig. 13) in the plates 242, 264.

Secured to the lever 404 is a pointer 427 movable over an indicator plate 428 fastened to the machine frame. This indicator plate, as shown in Fig. 3a, carries indications for the proper setting of the lever 404. In one place on the plate occur the words "kid" and "goat", the arrangement being such that when the pointer is in the place indicated by these words, the hardened plug 294 (Fig. 13) will be brought opposite to the ends of the compound rods 280, 284 and 300, 302 to secure proper adjustment of the mirrors. The indicator plate 428 will also carry other designations such as "sheep", "calf" and "kip" to aid the operator in proper adjustment of the machine and particularly of the lever 404 and the shaft 272.

Means is provided in the illustrated machine for counting the number of skins measured. This counter is indicated at 430 (Fig. 5). It may be of any desired construction and is shown as operated from a lever 432 which is connected by a link 434 with an arm 436 integral with the lever 176. It will be remembered that the lever 176 is moved in one direction and then allowed to move to initial position each time that a skin is passed through the machine. Hence, this lever 176 is conveniently used to act as the prime mover of the counting mechanism 430.

In operating the illustrated machine a piece of work, such as a calf skin, is introduced over the table 2 and work support 4 (Figs. 2 and 3) until its forward end is engaged with the feeding-in roll 34 which, in co-operation with the lower roll 8, feeds the work to the calipering wheels 36. After the work has been engaged by the feeding-in rolls 8 and 30 it is not necessary for the operator to advance the work himself but after said engagement the work should be carefully spread out with the idea in mind of eliminating all folds and wrinkles from the work since such wrinkles or folds, if permitted to pass under the calipering wheels, would render the thickness measurements inaccurate. Due to the means heretofore described, there will be no indication of measurement on the indicating glass 46 while a predetermined portion at the front end of the skin is passing under the calipering wheels 36. Furthermore, there will, in certain cases, be an unmeasured or unindicated portion at the rear end of the skin. In this way, indicating operations are confined to a predetermined intermediate portion in the length of the skin where the best portions of the skin are located. While the calipering wheels 36 are moving over this predetermined portion, the mirrors will be constantly adjusted in accordance with variations in the thickness of the work and at the end of such measurement will be locked to show not only the average thickness of the work in the measured portion but also the minimum and maximum thickness dimensions of the part measured. In most cases the operator will mark, or otherwise indicate classification of, the skin as indicated by the average thickness dimensions shown on the indicating plate 46. However, he may depart from this classification if either the minimum or the maximum thickness dimension indicating means suggests the advisability of changing the classification indicated by the average thickness dimension indicating means. As each skin is removed by an assistant at the back of the machine the operator will introduce a fresh piece of work at the front of the machine. It is usual for the assistant to distribute the skins or other pieces of work in different piles in accordance with the directions of the operator at the front of the machine.

Having described my invention, what I claim as new and desire to secure by Letters Patent of the United States is:

1. In a measuring machine, means for calipering the work, indicating means, connections between the calipering and the indicating means by which the latter may be responsive to the former, a work contacting member, and means comprising a rotary member driven by the work contacting member for causing the indicating means to be responsive to the calipering means with respect to a predetermined portion only of the piece of work.

2. In a measuring machine, rotary members for calipering the work, indicating means, connections between the calipering members and the indicating means by which the latter may be responsive to the former, a work contacting member, and means comprising a rotary member driven by the work contacting member and also controlled thereby for causing the indicating means to be responsive to the calipering members with respect to a predetermined portion only of the piece of work.

3. In a measuring machine, means for calipering the work, indicating means, connections between the calipering and the indicating means by which the latter may be responsive to the former, a movable work contacting member, and means comprising a cam secured to and movable with the work contacting member and having connections controlled by said work contacting member for rendering the indicating means unresponsive to the calipering means for a predetermined distance at the front or entering end of the work and subsequently responsive to the calipering means whereby indicating operations take place over a portion of the work spaced a predetermined distance from the front or entering end of the work.

4. In a measuring machine, means for calipering the work, indicating means, connections between the calipering and the indicating means by which the latter may be responsive to the former, a work contacting member, and means comprising a rotary cam driven by the work contacting member and having connections controlled by said work contacting member for causing the indicating means to be alternately responsive and unresponsive to the calipering means whereby measurement of an intermediate portion only of the piece of work is indicated by the indicating means.

5. In a measuring machine, work calipering members, indicating means, connections between the calipering members and the indicating means whereby the latter may be responsive to the former, means for rendering the indicating means responsive or unresponsive to the calipering members, a rotary work contacting member, and means comprising a rotary member provided with a plurality of cams and having driving connections with the rotary work contacting member for controlling the operation of said means for rendering the indicating means responsive or unresponsive to the calipering members.

6. In a measuring machine, calipering means for the work, indicating means, connections between the calipering and the indicating means by which the latter may be responsive to the former, a work contacting member arranged to be driven by the work, a rotary timing mechanism between the work contacting member and the indicating means, and connections between the timing mechanism and the work contacting member for driving the former from the latter and for initiating and terminating operations of the timing mechanism.

7. In a measuring machine, calipering means for the work, indicating means, connections between the calipering and the indicating means by which the latter may be responsive to the former, a work contacting member arranged to be driven by the work, timing mechanism comprising a cam having connections with the indicating means, and connections between the cam and the work contacting member for driving the former from the latter and for controlling the operations of the timing mechanism with respect to the position of the work.

8. In a measuring machine, work calipering means, indicating means, connections between the calipering means and the indicating means by which the latter may be responsive to the former, a work contacting member arranged to be driven by the work, a timing mechanism geared to the work contacting member to be driven thereby, and connections between the timing mechanism and the indicating means for making the latter responsive or unresponsive to the calipering means.

9. In a measuring machine, means for calipering the work, indicating means, connections between the calipering and the indicating means by which the latter may be responsive to the former, a work-driven work contacting member, means for controlling the indicating means to cause the latter to become either responsive or unresponsive to the calipering means, and connections comprising a rotary member between the work contacting member and said controlling means for driving the latter from the work contacting member in timed relation to the position of the work.

10. In a measuring machine, relatively movable members for calipering the work, indicating means, connections between the calipering members and the indicating means by which the latter may be responsive to the former, a work contacting member, means for controlling the indicating means to cause the latter to become either responsive or unresponsive to the calipering members, means for preventing operation of the controlling means, and connections comprising a friction clutch between said controlling means and the work contacting member whereby the latter may drive the controlling means in timed relation to the position of the work, and whereby said work contacting member may continue to move while said controlling means is prevented from operating.

11. In a measuring machine, relatively movable members for calipering the work, indicating means, connections between the calipering members and the indicating means by which the latter may be responsive to the former, a work contacting member, controlling means for determining the response of the indicating means to the calipering members, means for locking the controlling means, means comprising a friction clutch for driving the controlling means from the work contacting member, and connections between the locking means and the work contacting member whereby as the latter is raised by the entering end of the work the locking means is moved to inoperative position thus permitting driving of the controlling means by the work contacting member through said friction clutch.

12. In a measuring machine, work calipering members, indicating means, connections between the calipering members and the indicating means by which the latter may be responsive to the former, work-driven work contacting member, a timing mechanism, gears for driving the timing mechanism from the work contacting member, means for rendering the driving gears operative when the work contacting member rides upon the front or entering end of the work, and connections between the timing mechanism and the indicating means for making the latter responsive or unresponsive to the calipering members.

13. In a measuring machine, work calipering members, indicating means, connections between the calipering members and the indicating means by which the latter may be responsive to the former, a work contacting member, a cam wheel, connections for driving the cam wheel from the work contacting member, connections between the cam wheel and the indicating means for rendering the indicating means responsive or unresponsive to the calipering members, and means controlled by the work contacting member for rendering said cam wheel operative at times and inoperative at other times whereby the indicating means is rendered responsive to the calipering members while certain portions only of the work are passing the work calipering members and unresponsive while other portions are passing said calipering members.

14. In a measuring machine, work calipering means, indicating means, connections between the calipering means and the indicating means by which the latter may be responsive to the former, a work contacting member, a cam, connections for driving the cam from the work contacting member, connections between the cam and the indicating means for rendering the indicating means responsive or unresponsive to the calipering means, and means controlled by the work contacting member for locking and unlocking said cam whereby the indicating means is rendered responsive to the calipering means while certain portions only of the work are passing the work calipering means and unresponsive while other portions are passing said calipering means.

15. In a measuring machine, means for calipering the work, indicating means, connections between the calipering and the indicating means by which the latter may be responsive to the former, a work contacting member, cam means for controlling the response of the indicating means to the calipering means, means for locking the cam means against movement comprising two pawls alternately operative for the purpose, and connections between the work contacting member and said pawls whereby, as the work contacting member is lifted by the entering end of the work, one pawl is moved to release the cam member and the other pawl is moved to position to act as a locking means, and as the work contacting member drops off of the rear or following end of the work said other pawl is again moved to inoperative position to release the cam member.

16. In a measuring machine, means for calipering the work, indicating means, connections between the calipering and the indicating means by which the latter may be responsive to the former, a work contacting member, a cam member for controlling the response of the indicating means to the calipering means, driving means between the cam means and the work contacting member comprising a friction clutch, means for locking the cam member against movement comprising two pawls, and means for connecting the pawls for operation by said work contacting member whereby one pawl is moved to unlocking position and the other to locking position as the work contacting member is raised by the front or entering end of the work, the said pawls being subsequently operated in the reverse direction as the work contacting member drops off of the rear end of the work.

17. In a measuring machine, means for calipering the work, indicating means, said calipering means comprising a plurality of wheels, yoke members for supporting said wheels, said yoke members having both downwardly and upwardly facing surfaces, a vertically movable member arranged to be lifted through connections with said upwardly facing surfaces, another vertically movable member arranged to be lowered by connections with said downwardly facing surfaces, and connections between said vertically movable members and the indicating means for causing the indicating means to indicate the maximum thickness of the measured portion of the work and also the minimum thickness thereof.

18. In a measuring machine, means for calipering the work, indicating means, a work contacting member, said indicating means comprising a plurality of indicating members and said calipering means comprising a plurality of wheels for contacting with the work, yoke members for supporting the wheels and having both upwardly and downwardly facing surfaces, a member arranged to be lifted by the upwardly facing surfaces of the yoke members, a second member arranged to be lowered by the downwardly facing surfaces of the yoke members, means for frictionally holding the two last-recited members so that they are maintained in the positions to which they are moved by the operation of the yoke members, connections between said last-recited members and the indicating members whereby one of the indicating members is caused to indicate progressively increasing thickness dimensions and the other progressively decreasing thickness dimensions in the work calipered by the calipering means, a cam member arranged to be controlled by said work contacting member, and connections arranged to be operated by said cam member for rendering the indicating means responsive or unresponsive to the movements of said members operated by the yoke members.

19. In a measuring machine, means for calipering the work, indicating means, a work contacting member, said indicating means comprising a plurality of indicating members and said calipering means comprising a plurality of wheels for contacting with the work, yoke members for supporting the wheels and having both upwardly and downwardly facing surfaces, a member arranged to be lifted by the upwardly facing surfaces of the yoke members, a second member arranged to be lowered by the downwardly facing surfaces of the yoke members, means for frictionally seizing the two last-recited members so that they are maintained against the action of gravity in the positions to which they are moved by the operation of the yoke members, connections between said last-recited members and the indicating members whereby one of the indicating members is caused to indicate progressively increasing thickness dimension and the other progressively decreasing thickness dimensions in the work measured by the measuring means, a cam member arranged to be controlled by the work contacting member, means comprising a friction clutch for driving the cam member, and a pair of levers arranged to be operated by the cam member, one lever having connections for rendering the indicating means operative and the other lever having connections for controlling the friction clutch, whereby the vertically movable members operated by the yoke members are alternately released and frictionally seized in properly timed relation to the movement of the work.

20. In a measuring machine, members for calipering the work, indicating means, connections between the calipering members and the indicating means by which the latter may be responsive to the former, a work contacting member, said connections comprising an endwise movable member arranged to be moved in one direction only by the calipering members, and means operated by the work contacting member independently of said endwise-movable member and arranged to engage the endwise-movable member to hold the latter against movement in the opposite direction whereby it finally effects indication of the maximum dimension of the work being measured.

21. In a thickness measuring machine, calipering elements for contacting with the work to be measured and arranged to be lifted various distances in accordance with variations in the thickness of the work, indicating means, connections between the indicating means and the calipering elements comprising an endwise-movable member arranged to be moved in one direction upon upward movement only of one or more of the calipering elements encountering thicker parts of the work, and means controlled by the work arranged to engage said member to hold it against movement in the opposite direction, whereby said member finally effects indication of the maximum dimension of the work being measured.

22. In a thickness measuring machine, calipering elements adapted to contact with the work and to be lifted thereby various distances in accordance with variations in the thickness of the work as the latter is moved relatively to the calipering elements, indicating means, a single endwise-movable member arranged to be moved in one direction upon downward movement only of one or more of the calipering elements, means to engage said member to hold it against movement in the other direction, and connections between the last-recited member and the indicating means whereby the indicating means is caused to indicate minimum thickness dimensions of the work.

23. In a thickness measuring machine, calipering elements for contacting with the work to be measured and arranged to move up and down various distances in accordance with variations in the thickness of the work, indicating means, and connections between the indicating means and the calipering elements comprising a member arranged to be operated upon upward movement only of one or more of the calipering elements as the latter encounter thicker portions of the work, and another member arranged to be operated upon downward movement only of one or more of the calipering elements as the latter encounter thinner portions of the work, whereby the indicating means is caused to indicate progressively increasing and decreasing thickness dimensions in the work being measured.

24. In a thickness measuring machine, calipering elements adapted to contact with the work and to be moved up and down thereby various distances in accordance with variations in the thickness of the work as the latter is moved relatively to the calipering elements, indicating means, a member arranged to be operated upon upward movement only of one or more of the calipering elements as the latter encounter thicker portions of the work, another member arranged to be operated upon downward movement only of one or more of the calipering elements as the latter encounter thinner portions of the work, and connections between the two members last recited and the indicating means whereby the indicating means is caused to indicate finally the minimum and maximum thickness dimensions of the work in the portions calipered by the calipering elements.

25. In a thickness measuring machine, calipering elements for contacting with the work to be measured and arranged to move up and down various distances in accordance with variations in the thickness of the work during relative movement between the work and the calipering elements, indicating means, supporting members for the calipering elements movable with the latter during their up and down movements, said supporting members having upwardly and downwardly facing surfaces, motion transmitting members having portions for contacting with said upwardly and downwardly facing surfaces respectively of the said supporting members so that one of said transmitting members is moved during upward movement only of one or more of said supporting members while the other transmitting member is moved during downward movement only of one or more of said supporting members, and connections between said transmitting members and the indicating means whereby the indicating means is caused to indicate finally the maximum and the minimum thickness dimensions of a piece of work.

26. In a thickness measuring machine, calipering elements for contacting with the work to be measured and arranged to be moved up and down various distances in accordance with variations in the thickness of the work during relative movement between the work and the calipering elements, indicating means, supporting members for the calipering elements movable with the latter during their up and down movements, said supporting members having upwardly and downwardly facing surfaces, motion transmitting members having portions for contacting with said upwardly and downwardly facing surfaces respectively of said supporting members so that one of said transmitting members is moved during upward movement only of one or more of said supporting members while the other transmitting member is moved during downward movement only of one or more of said supporting members, connections between the transmitting members and the indicating means comprising rods, one of which contacts with one of the transmitting members to be moved thereby in one direction, the other rod being connected to the other transmitting member to be moved in the other direction, and friction clutching means for permitting movement of the rods each in one direction only whereby the indicating means is operated to indicate progressively increasing and decreasing thickness dimensions until the maximum and the minimum thickness dimensions of the work are obtained.

27. In a thickness measuring machine, work calipering elements arranged to be moved up and down various distances by the work in accordance with thickness variations in the latter during relative movement between the work and the calipering elements, indicating means, members associated with the calipering elements and each having an upwardly facing surface and a downwardly facing surface, a member arranged to make contact with the upwardly facing surfaces, a second member arranged to make contact with the downwardly facing surfaces, the member arranged to make contact with the upwardly facing surfaces moving upwardly only with said surfaces, a connection between the indicating means and the member which contacts with said upwardly facing surface, said connection comprising means for holding the connection against downward movement so that it remains in the position to which it is moved by the upwardly facing surfaces, a connection between the indicating means and said member which contacts with said downwardly facing surfaces, and said last-mentioned connection comprising means for suspending it for movement only by said downwardly facing surfaces, whereby the indicating means is caused to indicate progressively increasing and decreasing thickness dimensions until the maximum and minimum thickness dimensions of the piece of work are measured and indicated.

28. In a machine for measuring thickness dimensions of a piece of work, members for calipering the thickness of the work during relative movement between the work and the work calipering members in a direction to pass the work by the calipering members, indicating means comprising a plurality of light reflectors, connections between certain of the work calipering members and one of the reflectors for adjusting said reflector in accordance with certain variations in the dimensions of the piece of work, connections between other work calipering members and another reflector to adjust the latter with respect to other variations in the work, a single source of light arranged to project a bar of light upon the reflectors, and an indicator surface for receiving the bars of light projected by both said light reflectors.

29. In a measuring machine, work calipering members arranged to be moved by the work during relative movement between the work and the work calipering members, indicating means comprising three reflectors spaced with respect to each other, means for movably mounting the reflectors, means for projecting a bar of light on the reflectors which will project individual bars of light due to their spacing relatively to each other, an indicator plate positioned to have said bars of light projected thereon from the reflector, means for connecting one of the calipering members with one of the reflectors so that movement of the calipering member effects adjustment of its associated reflector, means for connecting another calipering member to a second reflector, and connections between the two mentioned reflectors to the third reflector comprising an equalizing lever for causing the third reflector to indicate an average of the indications reflected by the two first-mentioned reflectors.

30. In a thickness measuring machine, calipering members arranged to contact with the work to be moved up and down thereby during relative movement between the work and the calipering members, indicating means comprising two reflectors, connections between the work calipering members and one of the reflectors for moving the latter in one direction only during upward movement of the calipering members as progressively thicker portions of the work are encountered by the calipering members, connections between the work calipering members and the other reflector for moving the latter in another direction only as the work calipering members move downwardly as the progressively thinner portions of the work are encountered, means for projecting bars of light upon said reflectors, and an indicator plate positioned to receive said bars of light from said reflectors, whereby the bar of light from one reflector indicates progressively thicker portions in the work while the other indicates progressively thinner portions in the piece of work during measurement of the latter.

31. In a thickness measuring machine, calipering members arranged to contact with the work to be moved up and down thereby during relative movement between the work and the calipering members, indicating means comprising two reflectors, connections between the work calipering members and one of the reflectors for moving the latter in one direction only during upward movement of the calipering members as progressively thicker portions of the work are encountered by the calipering members, connections between the work calipering members and the other reflector for moving the latter in another direction only as the work calipering members move downwardly as the progressively thinner portions of the work are encountered, means for projecting bars of light upon said reflectors, an indicator plate positioned to receive said bars of light from said reflectors whereby the bar of light from one reflector indicates progressively thicker portions in the work while the other indicates progressively thinner portions in the piece of work during measurement of the latter, a third reflector, and connections between the two first-mentioned reflectors and the third reflector for positioning the third reflector midway between the other two whereby a beam of light from said third reflector indicates the average thickness of the work, as determined by reference to the maximum and minimum thickness dimensions.

32. In a measuring machine, means for calipering thickness dimensions of portions of a piece of work, means for indicating the minimum and maximum thickness dimensions of the calipered portions, connections between the calipering and the indicating means by which the latter may be responsive to the former, a rotary work contacting member, means for controlling the indicating means to cause the latter to become either responsive or unresponsive to the calipering means, and connections between the rotary work contacting member and said controlling means for driving the latter in timed relation to the position of the work.

33. In a measuring machine, means for calipering thickness dimensions of portions of a piece of work, means for indicating the minimum and maximum thickness dimensions of the calipered portions, connections between the calipering and the indicating means by which the latter may be responsive to the former, said connections comprising a member vertically movable in one direction only to transmit movements of the calipering means due to the progressively thicker portions of the work and another member movable vertically in another direction only to transmit movements of the calipering means when the latter encounters progressively thinner portions of the work, a work contacting member controlled by the position of the work, and means operated by the work contacting member for controlling said vertically movable members to cause the latter to become either responsive or unresponsive to the calipering means, whereby the indicating means is operative in timed relation to the position of the work.

34. In a measuring machine, means for calipering thickness dimensions of portions of a piece of work, means for indicating the minimum and maximum thickness dimensions of the calipered portions, connections between the calipering and the indicating means by which the latter may be responsive to the former, said connections comprising a member vertically movable in one direction only to transmit movements of the calipering means due to progressively thicker portions of the work and another member movable vertically in another direction only to transmit movements of the calipering means when the latter encounters progressively thinner portions of the work, a work contacting member arranged to be lifted by the entering end of the work, controlling means for causing said vertically movable members to become responsive to the calipering means, and means for driving the controlling means from the work contacting member, whereby as the latter is raised by the entering end of the work the controlling means becomes operative to determine operation of said vertically movable members in timed relation to the work.

35. In a measuring machine, means for calipering the work, indicating means, said indicating means comprising a plurality of indicating members and said calipering means comprising a plurality of wheels for contacting with the work, yoke members for supporting the wheels and having both upwardly and downwardly facing surfaces, a member arranged to be lifted by the upwardly facing surfaces of the yoke members, a second member arranged to be lowered by the downwardly facing surfaces of the yoke members, means for frictionally holding the two last-recited members so that they are maintained in the positions to which they are moved by the operation of the yoke members, and connections between said last-recited members and the indicating members whereby one of the indicating members is caused to indicate progressively increasing thickness dimensions and the other progressively decreasing thickness dimensions in the work calipered by the calipering means.

ERASTUS E. WINKLEY.